US011081808B2

(12) United States Patent
Yun et al.

(10) Patent No.: US 11,081,808 B2
(45) Date of Patent: Aug. 3, 2021

(54) ANTENNA HAVING RADIATION STRUCTURE OF GIVEN DIRECTION AND ELECTRONIC DEVICE INCLUDING SAME

(71) Applicant: SAMSUNG ELECTRONICS CO., LTD., Suwon-si (KR)

(72) Inventors: Sumin Yun, Suwon-si (KR); Dongyeon Kim, Suwon-si (KR); Yoonjung Kim, Suwon-si (KR); Seongjin Park, Suwon-si (KR); Sehyun Park, Suwon-si (KR); Myunghun Jeong, Suwon-si (KR); Jehun Jong, Suwon-si (KR); Jaehoon Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 72 days.

(21) Appl. No.: 16/676,691

(22) Filed: Nov. 7, 2019

(65) Prior Publication Data

US 2020/0153115 A1    May 14, 2020

(30) Foreign Application Priority Data

Nov. 9, 2018   (KR) .................. 10-2018-0137020

(51) Int. Cl.
*H01Q 21/06* (2006.01)
*H01Q 5/30* (2015.01)
(Continued)

(52) U.S. Cl.
CPC ......... *H01Q 21/065* (2013.01); *G06F 3/0412* (2013.01); *H01Q 3/36* (2013.01); *H01Q 5/30* (2015.01)

(58) Field of Classification Search
CPC ...... H01Q 21/065; H01Q 21/08; H01Q 21/29; H01Q 21/293; H01Q 5/30; H01Q 3/36;
(Continued)

(56) References Cited

U.S. PATENT DOCUMENTS 9,035,846 B2   5/2015  Liang et al.
9,972,892 B2   5/2018  Noori et al.
(Continued)

FOREIGN PATENT DOCUMENTS

KR   10-2016-0034042   3/2016
KR   10-2017-0135980   12/2017

OTHER PUBLICATIONS

International Search Report dated Feb. 20, 2020 in counterpart International Patent Application No. PCT/KR2019/015037.

*Primary Examiner* — Seokjin Kim
(74) *Attorney, Agent, or Firm* — Nixon & Vanderhye, P.C.

(57) ABSTRACT

An electronic device may include a housing including a first plate facing a first direction, a second plate facing a second direction opposite the first direction, and a side housing surrounding a space between the first plate and the second plate, wherein the side housing includes a first portion, including an external metal portion having a first face facing an outside and a second face facing the space and an internal polymer portion having a third face contacting the second face and a fourth face facing the space, a touch screen display positioned within the space to be viewable through the first plate, wherein an edge of the touch screen display is spaced apart from the first portion of the side housing and when the first plate is viewed from above, the gap is covered by a peripheral portion of the first glass plate, an antenna structure comprising at least one antenna and configured to include a substrate having a fifth face substantially parallel to the second face and a sixth face facing a direction opposite the fifth face and at least one conductive pattern positioned between the fifth face and the sixth face and extending toward the peripheral portion of the first plate, and wireless communication circuitry operatively connected to (Continued)

the at least one conductive pattern and configured to form a directivity beam using at least a part of the at least one conductive pattern.

20 Claims, 27 Drawing Sheets

(51) Int. Cl.
*H01Q 3/36* (2006.01)
*G06F 3/041* (2006.01)

(58) Field of Classification Search
CPC ...... H01Q 9/065; H01Q 9/0407; H01Q 1/243; H01Q 1/2258; H01Q 1/2266; G06F 3/0412; G06F 3/041; G06F 1/1626; G06F 1/1643; G06F 1/1698
See application file for complete search history.

(56) References Cited

U.S. PATENT DOCUMENTS

| | | |
|---|---|---|
| 10,177,440 B2 | 1/2019 | Jung et al. |
| 2016/0322714 A1 | 11/2016 | Ying et al. |
| 2017/0054199 A1 | 2/2017 | Gang et al. |
| 2017/0237154 A1 | 8/2017 | Choudhury et al. |
| 2017/0250460 A1* | 8/2017 | Shin ................ H04M 1/0266 |
| 2018/0364869 A1* | 12/2018 | Lee ................... G06F 3/0421 |
| 2019/0137333 A1* | 5/2019 | Lim ................ G02F 1/13318 |
| 2020/0014781 A1* | 1/2020 | Lee ................... H04M 1/0264 |
| 2020/0169007 A1* | 5/2020 | Song ................. H01Q 21/293 |

* cited by examiner

ANTENNA HAVING RADIATION STRUCTURE OF GIVEN DIRECTION AND ELECTRONIC DEVICE INCLUDING SAME

CROSS-REFERENCE TO RELATED APPLICATION

This application is based on and claims priority under 35 U.S.C. § 119 to Korean Patent Application No. 10-2018-0137020, filed on Nov. 9, 2018, in the Korean Intellectual Property Office, the disclosure of which is incorporated by reference herein in its entirety.

BACKGROUND

Field

The disclosure relates to an antenna having a radiation structure of a given direction and an electronic device including the same.

Description of Related Art

With the development of wireless communication technology, electronic devices (e.g., communication electronic devices) are commonly used in daily life; thus, use of contents is increasing exponentially. Because of such rapid increase in the use of contents, a network capacity is reaching its limit. After commercialization of 4th generation (4G) communication systems, in order to meet growing wireless data traffic demand, a communication system (e.g., 5th generation (5G) or pre-5G communication system, or new radio (NR))) that transmits and/or receives signals using a frequency of a high frequency (e.g., millimeter wave (mmWave)) band (e.g., 3 GHz to 300 GHz band) is being studied.

An electronic device may include a display positioned in an internal space. The display may be positioned so that it is seen from the outside through at least partial area of the front plate of the electronic device. In recent electronic devices, the display may be positioned to occupy substantially the entire area of the front plate in order to meet user needs and use convenience.

An electronic device can transmit and receive signals using a next-generation wireless communication technology using a frequency of a substantially 3 GHz~100 GHz range. An efficient mounting structure for overcoming a high free space loss in terms of frequency characteristics and increasing the gain of an antenna and a new antenna structure for meeting the efficient mounting structure are being developed. In the antenna, a beam pattern may be formed in the side member direction or rear plate direction of the electronic device unless a surrounding conductive member is disposed substantially through a wireless communication circuitry. However, the beam pattern may be derived to be formed up to the front plate direction of the electronic device according to recent needs for the extension of beam coverage.

As described above, however, in the electronic device, the display including a conductive member (e.g., Cu plate) is positioned to occupy substantially most of the area of the front plate. Accordingly, there may be many difficulties in forming beam coverage in the front plate direction due to the antenna.

SUMMARY

Embodiments of the disclosure may provide an antenna having a radiation structure of a given direction and an electronic device including the antenna.

According to various example embodiments, an electronic device may include a housing including a first plate facing a first direction, a second plate facing a second direction opposite the first direction, and a side housing surrounding a space between the first glass plate and the second plate, wherein the side housing includes a first portion, including an external metal part having a first face facing an outside and a second face facing the space and an internal polymer portion having a third face in contact with the second face and a fourth face facing the space, a touch screen display positioned within the space to be seen through the first glass plate, wherein an edge of the touch screen display is spaced apart from the first portion of the side member and when the first glass plate is viewed from above, the gap is covered by a peripheral portion of the first glass plate, an antenna structure comprising at least one antenna configured to include a substrate having a fifth face substantially parallel to the second face and a sixth face facing a direction opposite the fifth face and at least one conductive pattern positioned between the fifth face and the sixth face and extending toward the peripheral portion of the first glass plate, and wireless communication circuitry operatively connected to the at least one conductive pattern and configured to form a directivity beam using at least some of the at least one conductive pattern.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
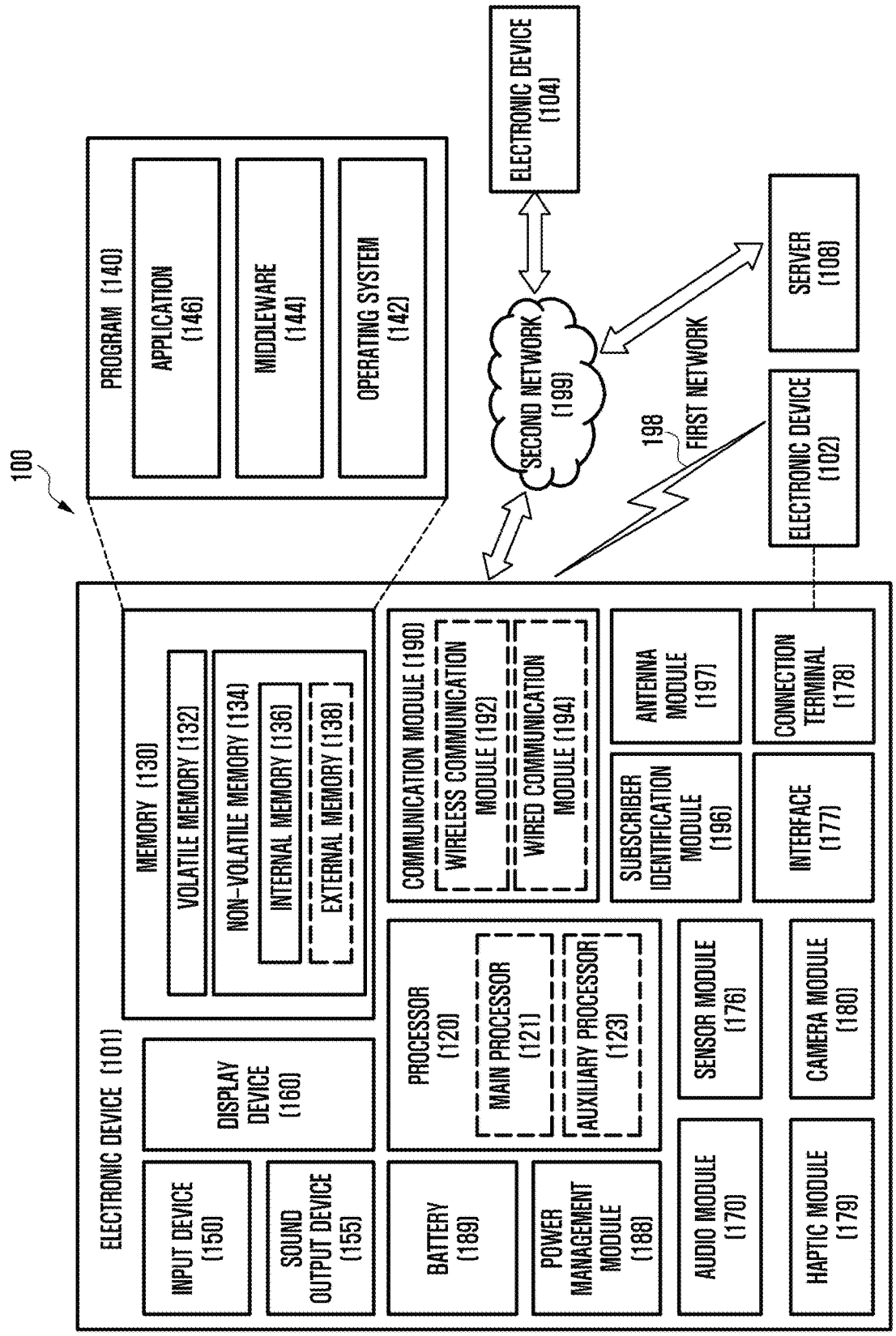
FIG. 1 is a block diagram illustrating an example electronic device within a network environment according to various embodiments.

FIG. 1 is a block diagram illustrating an example electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to an embodiment may be one of various types of electronic devices. The electronic device may include, for example, and without limitation, a portable communication device (e.g., a smart phone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment.

With regard to the description of the drawings, similar reference numerals may be used to refer to similar or related elements.

A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases.

As used herein, such terms as "$1^{st}$" and "$2^{nd}$", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

The term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
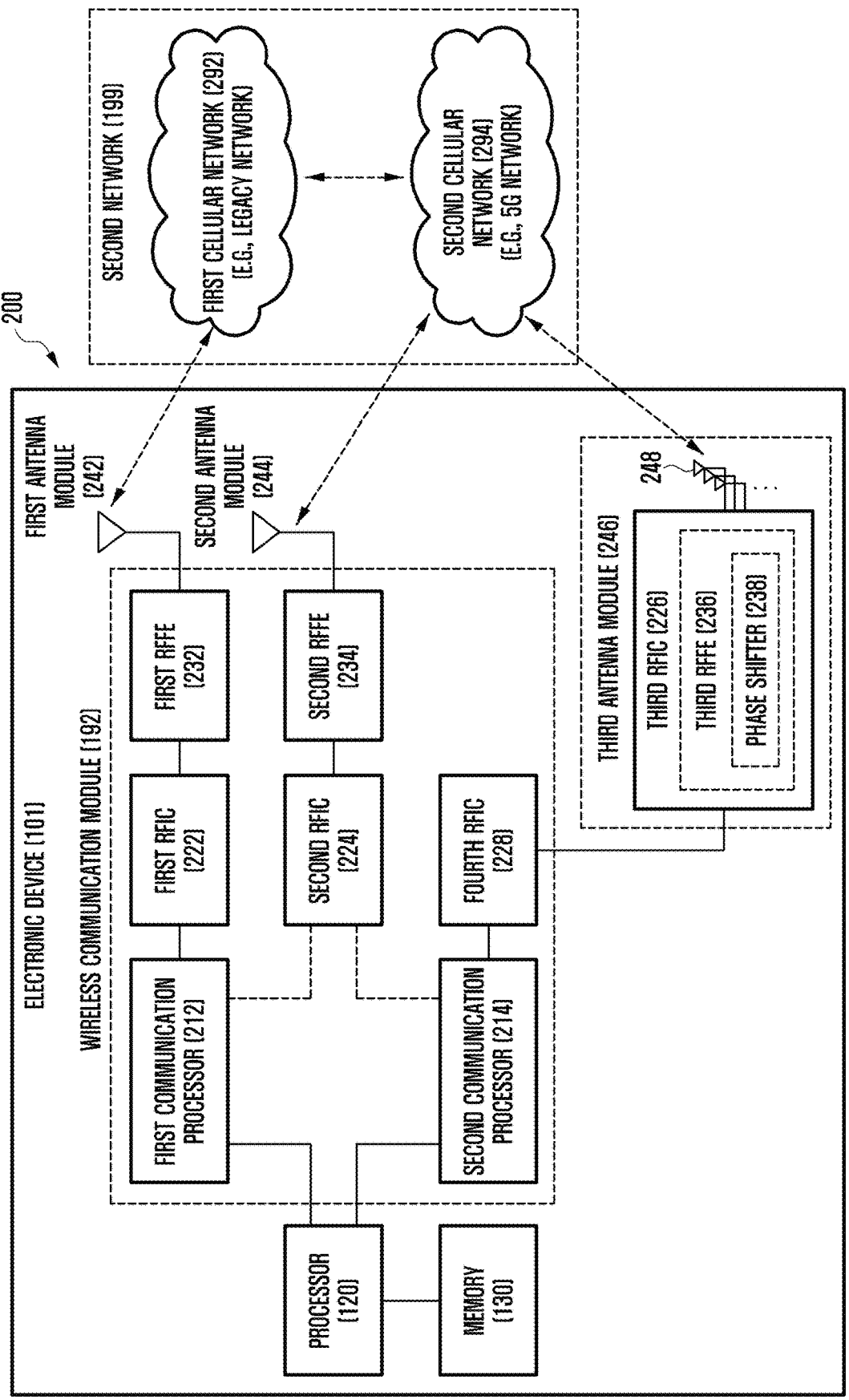
FIG. 2 is a block diagram illustrating an example electronic device for supporting legacy network communication and 5G network communication according to various embodiments.

FIG. 2 is a block diagram illustrating an example electronic device for supporting legacy network communication and 5G network communication according to various embodiments of the disclosure.

Referring to FIG. 2, the electronic device 101 may include a first communication processor (e.g., including processing circuitry) 212, second communication processor (e.g., including processing circuitry) 214, first radio frequency integrated circuit (RFIC) 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to another embodiment, the electronic device 101 may further include at least one of the components described with reference to FIG. 1, and the second network 199 may further include at least one other network. According to an example embodiment, the first communication processor 212, second communication processor 214, first RFIC 222, second RFIC 224, fourth RFIC 228, first RFFE 232, and second RFFE 234 may form at least part of the wireless communication module 192. According to another embodiment, the fourth RFIC 228 may be omitted or included as part of the third RFIC 226.

The first communication processor 212 may establish a communication channel of a band to be used for wireless communication with the first cellular network 292 and support legacy network communication through the established communication channel. According to various embodiments, the first cellular network may be a legacy network including a second generation (2G), 3G, 4G, or long term evolution (LTE) network. The second communication processor 214 may establish a communication channel corresponding to a designated band (e.g., about 6 GHz to about 60 GHz) of bands to be used for wireless communication with the second cellular network 294, and support 5G network communication through the established communication channel. According to various embodiments, the second cellular network 294 may be a 5G network defined in 3GPP. Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to an example embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal to be processed by the second communication processor 214. According to an example embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal to be processed by the second communication processor 214.

According to an example embodiment, the first RFIC 222 and the second RFIC 224 may be implemented into at least part of a single package or a single chip. According to an example embodiment, the first RFFE 232 and the second RFFE 234 may be implemented into at least part of a single package or a single chip. According to an example embodiment, at least one of the first antenna module 242 or the second antenna module 244 may be omitted or may be combined with another antenna module to process RF signals of a corresponding plurality of bands.

According to an example embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to an example embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3A:
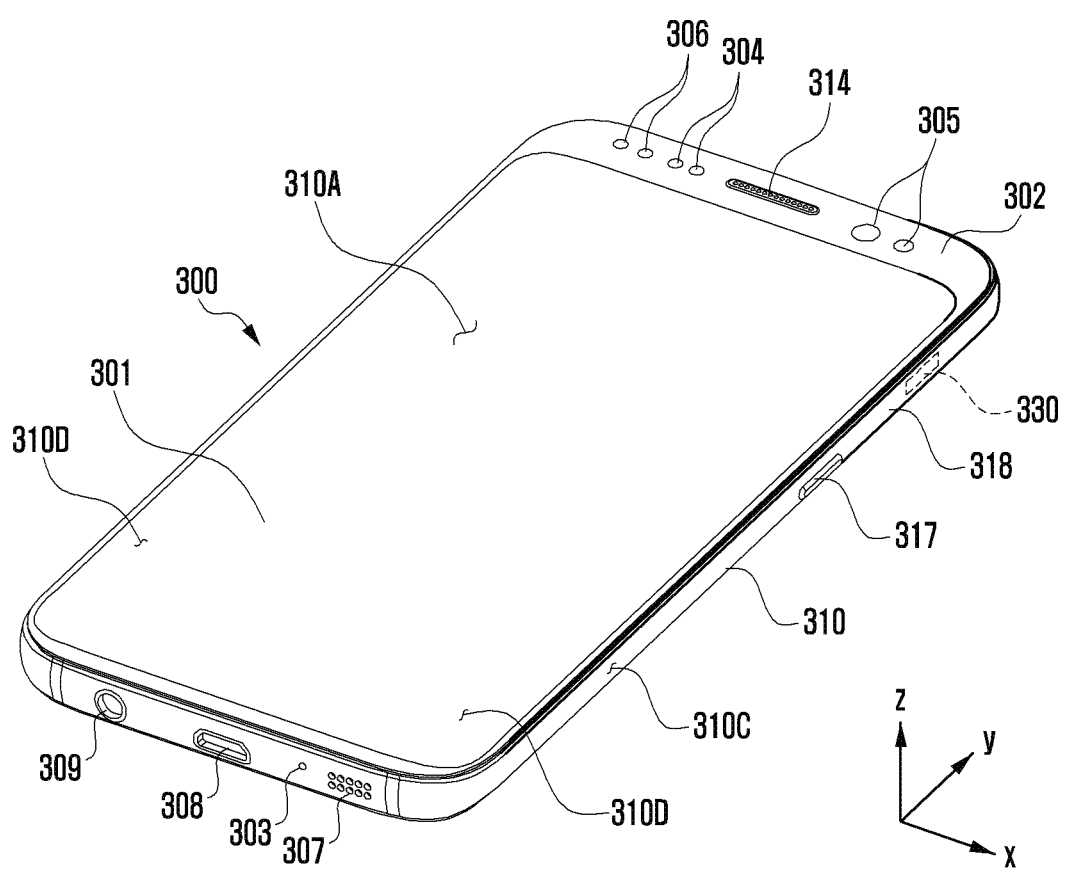
FIG. 3A is a front perspective view illustrating an example mobile electronic device according to various embodiments.

FIG. 3A is a front perspective view illustrating an example mobile electronic device 300 according to various embodiments of the disclosure.

Figure 3B:
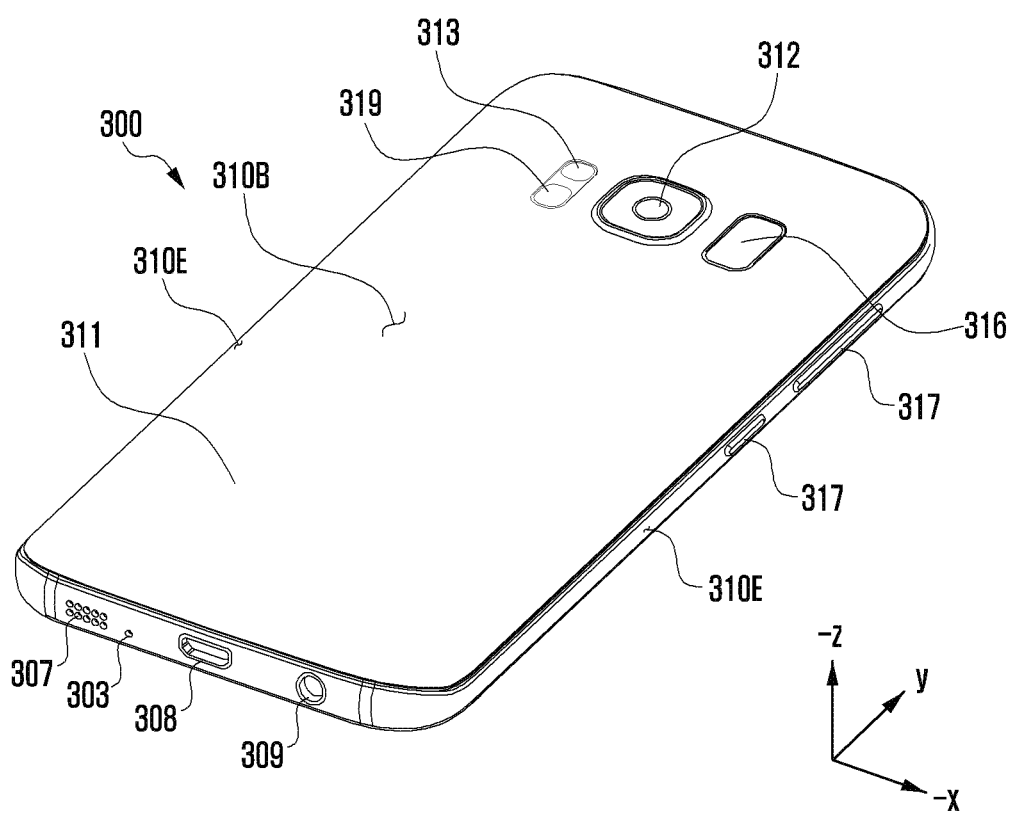
FIG. 3B is a rear perspective view illustrating the rear of the example mobile electronic device according to various embodiments.

FIG. 3B is a rear perspective view illustrating an example mobile electronic device 300 according to various embodiments of the disclosure.

Referring to FIGS. 3A and 3B, the mobile electronic device 300 (e.g., the electronic device 101 of FIG. 1) according to various embodiments may include a housing 310 including a first surface (or front surface) 310A, a second surface (or rear surface) 310B, and a side surface 310C enclosing a space between the first surface 310A and the second surface 310B. In an example embodiment (not illustrated), the housing may refer to a structure forming some of the first surface 310A, the second surface 310B, and the side surface 310C. According to an example embodiment, the first surface 310A may be formed by an at least partially substantially transparent front plate 302 (e.g., a polymer plate or a glass plate including various coating layers). The second surface 310B may be formed by a substantially opaque rear plate 311. The rear plate 311 may be formed by, for example, coated or colored glass, ceramic, polymer, metal (e.g., aluminum, stainless steel (STS), or magnesium), or a combination of at least two of the above materials. The side surface 310C may be coupled to the front plate 302 and the rear plate 311 and be formed by a side bezel structure (or "side member" or "side housing") 318 including a metal and/or a polymer. In some embodiments, the rear plate 311 and the side bezel structure 318 may be integrally formed and include the same material (e.g., metal material such as aluminum).

In the illustrated embodiment, the front plate 302 may include two first regions 310D bent and extending seamlessly from the first surface 310A toward the rear plate 311 at both ends of a long edge of the front plate 302. In the illustrated embodiment (see FIG. 3B), the rear plate 311 may include two second regions 310E bent and extending seamlessly from the second surface 310B towards the front plate 302 at both ends of a long edge. In some embodiments, the front plate 302 (or the rear plate 311) may include only one of the first regions 310D (or the second regions 310E). In an example embodiment, a portion of the first regions 310D or the second regions 310E may not be included. In the above embodiments, when viewed from the side surface of the mobile electronic device 300, the side bezel structure 318 may have a first thickness (or width) at a side surface in which the first region 310D or the second region 310E is not included and have a second thickness smaller than the first thickness at a side surface including the first region 310D or the second region 310E.

According to an example embodiment, the mobile electronic device 300 may include at least one of a display 301; audio modules 303, 307, and 314; sensor modules 304, 316, and 319; camera modules 305, 312, and 313; key input device 317; light emitting element 306; and connector holes 308 and 309. In some embodiments, the mobile electronic device 300 may omit at least one (e.g., the key input device 317 or the light emitting element 306) of the components or may further include other components.

The display 301 may be exposed through, for example, a substantial portion of the front plate 302. In some embodiments, at least part of the display 301 may be exposed through the front plate 302 forming the first region 310D of the side surface 310C and the first surface 310A. In some embodiments, an edge of the display 301 may be formed to be substantially the same as an adjacent outer edge shape of the front plate 302. In an example embodiment (not illustrated), in order to enlarge an area where the display 301 is exposed, a distance between an outer edge of the display 301 and an outer edge of the front plate 302 may be formed to be substantially the same.

In an embodiment (not illustrated), in a portion of a screen display area of the display 301, a recess or an opening may be formed, and at least one of the audio module 314 and the sensor module 304, the camera module 305, and the light emitting element 306 aligned with the recess or the opening may be included. In an example embodiment (not illustrated), at a rear surface of a screen display area of the display 301, at least one of the audio module 314, the sensor module 304, the camera module 305, the fingerprint sensor module 316, and the light emitting element 306 may be included. In an example embodiment (not illustrated), the display 301 may be coupled to or disposed adjacent to a touch detection circuit, a pressure sensor capable of measuring intensity (pressure) of the touch, and/or a digitizer for detecting a stylus pen of a magnetic field method. In some embodiments, at least part of the sensor modules 304 and 319 and/or at least part of the key input device 317 may be disposed in a first region 310D and/or a second region 310E.

The audio modules 303, 307, and 314 may include a microphone hole 303 and speaker holes 307 and 314. The microphone hole 303 may dispose a microphone for obtaining an external sound therein; and, in some embodiments, a plurality of microphones may be disposed to detect a direction of a sound. The speaker holes 307 and 314 may include an external speaker hole 307 and a call receiver hole 314. In some embodiments, the speaker holes 307 and 314 and the microphone hole 303 may be implemented into one hole, or the speaker may be included without the speaker holes 307 and 314 (e.g., piezo speaker).

The sensor modules 304, 316, and 319 may generate an electrical signal or a data value corresponding to an operating state inside the mobile electronic device 300 or an environment state outside the mobile electronic device 300. The sensor modules 304, 316, and 319 may include, for example, a first sensor module 304 (e.g., proximity sensor) and/or a second sensor module (not illustrated) (e.g., fingerprint sensor), disposed at the first surface 310A of the housing 310, and/or a third sensor module 319 (e.g., a heart rate monitor (HRM) sensor) and/or a fourth sensor module 316 (e.g., fingerprint sensor), disposed at the second surface 310B of the housing 310. The fingerprint sensor may be disposed at the second surface 310B as well as the first surface 310A (e.g., the display 301) of the housing 310. The mobile electronic device 300 may further include a sensor module (not illustrated), for example, at least one of a gesture sensor, gyro sensor, air pressure sensor, magnetic sensor, acceleration sensor, grip sensor, color sensor, IR sensor, biometric sensor, temperature sensor, humidity sensor, and illumination sensor 304.

The camera modules 305, 312, and 313 may include a first camera device 305 disposed at the first surface 310A of the mobile electronic device 300, a second camera device 312 disposed at the second surface 310B thereof, and/or a flash 313. The camera modules 305 and 312 may include one or a plurality of lenses, an image sensor, and/or an image signal processor. The flash 313 may include, for example, a light emitting diode or a xenon lamp. In some embodiments, two or more lenses (infrared camera, wide angle and telephoto lens) and image sensors may be disposed at one surface of the mobile electronic device 300.

The key input device 317 may be disposed at the side surface 310C of the housing 310. In an example embodiment, the mobile electronic device 300 may not include some or all of the above-described key input devices 317, and the key input device 317 that is not included may be implemented in other forms such as a soft key on the display 301. In some embodiments, the key input device 317 may include a sensor module 316 disposed at the second surface 310B of the housing 310.

The light emitting element 306 may be disposed at, for example, the first surface 310A of the housing 310. The light emitting element 306 may provide, for example, status information of the mobile electronic device 300 in an optical form. In an example embodiment, the light emitting element 306 may provide, for example, a light source interworking with an operation of the camera module 305. The light emitting element 306 may include, for example, a light emitting diode (LED), an IR LED, and a xenon lamp.

The connector ports 308 and 309 may include a first connector port 308 that may receive a connector (e.g., a USB connector) for transmitting and receiving power and/or data to and from an external electronic device and/or a second connector hole (e.g., earphone jack) 309 that can receive a connector for transmitting and receiving audio signals to and from an external electronic device.

Figure 3C:
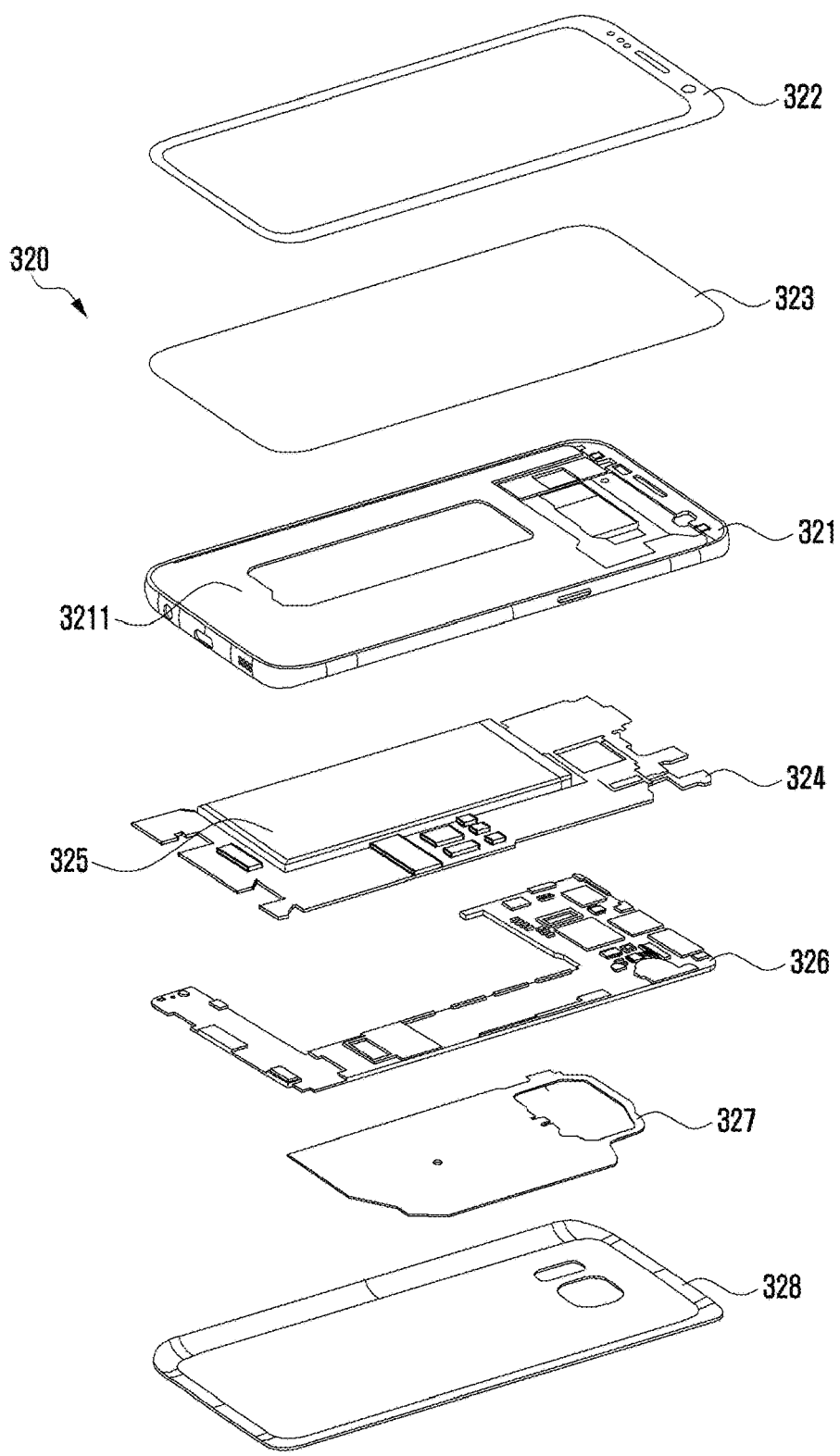
FIG. 3C is an exploded perspective view of the example mobile electronic device according to various embodiments.

FIG. 3C is an exploded perspective view illustrating an example mobile electronic device according to various embodiments of the disclosure. Referring to FIG. 3C, the mobile electronic device 320 (e.g., the mobile electronic device 300 of FIG. 3A) may include a side bezel structure 321, first support member 3211 (e.g., bracket), front plate 322, display 323, printed circuit board 324, battery 325, second support member 326 (e.g., rear case), antenna 327, and rear plate 328. In some embodiments, the electronic device 320 may omit at least one (e.g., the first support member 3211 or the second support member 326) of the components or may further include other components. At least one of the components of the electronic device 320 may be the same as or similar to at least one of the components of the mobile electronic device 300 of FIG. 3A or 3B and a duplicated description may not be repeated below.

The first support member 3211 may be disposed inside the electronic device 320 to be connected to the side bezel structure 321 or may be integrally formed with the side bezel structure 321. The first support member 3211 may be made of, for example, a metal material and/or a non-metal (e.g., polymer) material. In the first support member 3211, the display 323 may be coupled to one surface thereof, and the printed circuit board 324 may be coupled to the other surface thereof. In the printed circuit board 324, a processor, a memory, and/or an interface may be mounted. The processor may include, for example, one or more of a central processing unit, application processor, graphic processing unit, image signal processor, sensor hub processor, or communication processor.

The memory may include, for example, a volatile memory or a nonvolatile memory.

The interface may include, for example, a HDMI, USB interface, SD card interface, and/or audio interface. The interface may, for example, electrically or physically connect the electronic device 320 to an external electronic device and include a USB connector, an SD card/multimedia card (MMC) connector, or an audio connector.

The battery 325 is a device for supplying power to at least one component of the electronic device 320 and may include, for example, a non-rechargeable primary battery, a rechargeable secondary battery, or a fuel cell. At least part of the battery 325 may be disposed, for example, on substantially the same plane as that of the printed circuit board 324. The battery 325 may be integrally disposed inside the electronic device 320 or may be detachably disposed in the electronic device 320.

The antenna 327 may be disposed between the rear plate 328 and the battery 325. The antenna 327 may include, for example, a near field communication (NFC) antenna, wireless charging antenna, and/or magnetic secure transmission (MST) antenna. The antenna 327 may perform, for example, short range communication with an external device or may wirelessly transmit and receive power required for charging. In an example embodiment, an antenna structure may be formed by some or a combination of the side bezel structure 321 and/or the first support member 3211.

Figure 4A:
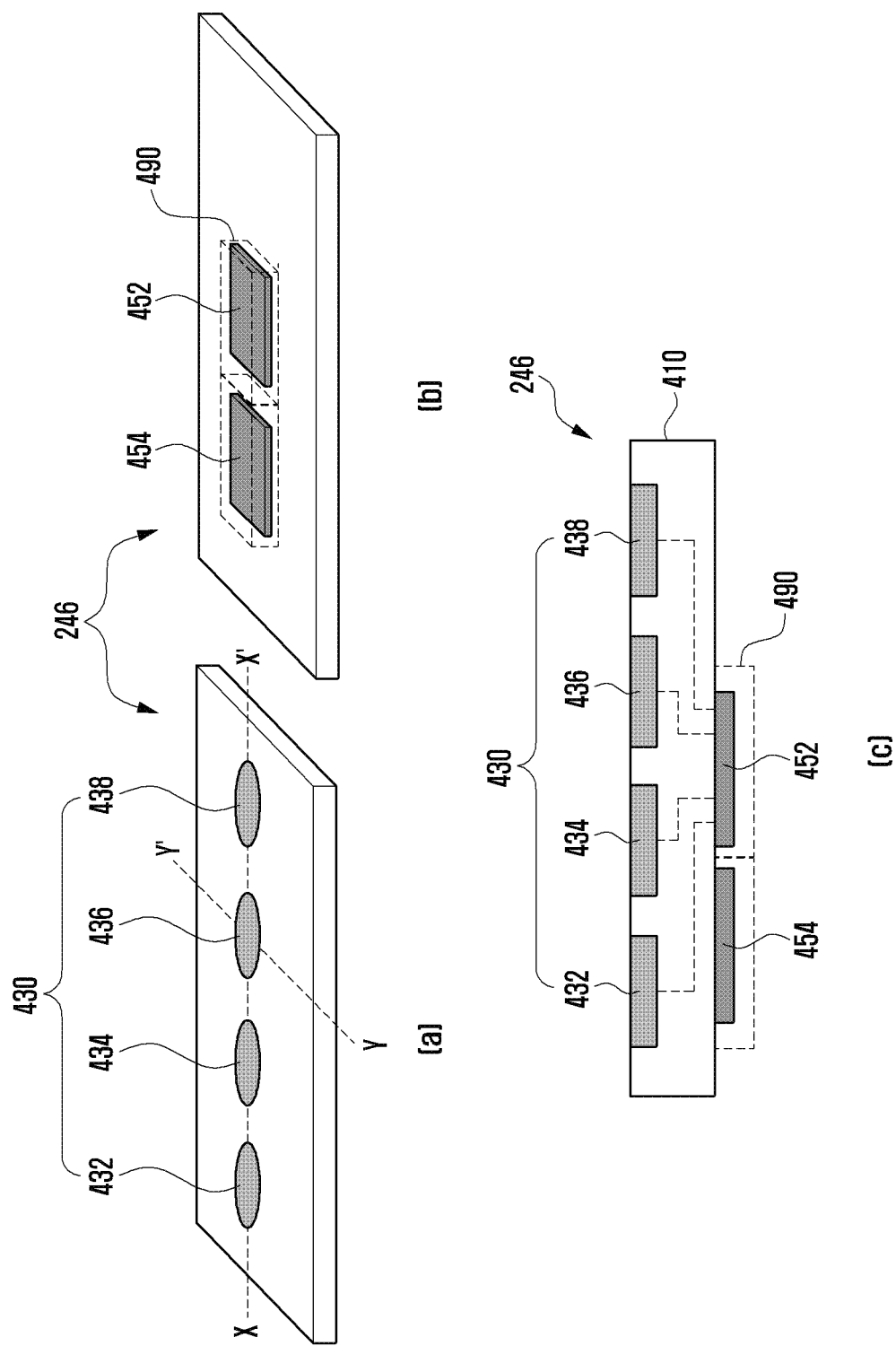
FIG. 4A is diagram illustrating an example structure of a third antenna module described with reference to FIG. 2 according to various embodiments.

FIG. 4A is diagram illustrating an example structure of a third antenna module described with reference to FIG. 2 according to various embodiments of the disclosure.

FIG. 4A(a) is a perspective view illustrating the third antenna module 246 viewed from one side, and FIG. 4A(b) is a perspective view illustrating the third antenna module 246 viewed from the other side. FIG. 4A(c) is a cross-sectional view illustrating the third antenna module 246 taken along line X-X' of FIG. 4A.

With reference to FIG. 4A, in an example embodiment, the third antenna module 246 may include a printed circuit board 410, an antenna array 430, a RFIC 452, and a PMIC 454. The third antenna module 246 may further include a shield member (e.g., a shield can) 490. In other embodiments, at least one of the above-described components may be omitted or at least two of the components may be integrally formed.

The printed circuit board 410 may include a plurality of conductive layers and a plurality of non-conductive layers stacked alternately with the conductive layers. The printed circuit board 410 may provide electrical connections between the printed circuit board 410 and/or various electronic components disposed outside using wirings and conductive vias formed in the conductive layer.

The antenna array 430 (e.g., 248 of FIG. 2) may include a plurality of antenna elements (e.g., at least one antenna) 432, 434, 436, or 438 disposed to form a directional beam. As illustrated, the antenna elements 432, 434, 436, or 438 may be formed at a first surface of the printed circuit board 410. According to another embodiment, the antenna array 430 may be formed inside the printed circuit board 410. According to the embodiment, the antenna array 430 may include the same or a different shape or kind of a plurality of antenna arrays (e.g., dipole antenna array and/or patch antenna array).

The RFIC 452 (e.g., the third RFIC 226 of FIG. 2) may be disposed at another area (e.g., a second surface opposite to the first surface) of the printed circuit board 410 spaced apart from the antenna array. The RFIC 452 is configured to process signals of a selected frequency band transmitted/received through the antenna array 430. According to an example embodiment, upon transmission, the RFIC 452 may convert a baseband signal obtained from a communication processor (not shown) to an RF signal of a designated band. Upon reception, the RFIC 452 may convert an RF signal received through the antenna array 430 to a baseband signal and transfer the baseband signal to the communication processor.

According to another embodiment, upon transmission, the RFIC 452 may up-convert an IF signal (e.g., about 9 GHz to about 11 GHz) obtained from an intermediate frequency integrate circuit (IFIC) (e.g., 228 of FIG. 2) to an RF signal of a selected band. Upon reception, the RFIC 452 may down-convert the RF signal obtained through the antenna array 430, convert the RF signal to an IF signal, and transfer the IF signal to the IFIC.

The PMIC 454 may be disposed in another partial area (e.g., the second surface) of the printed circuit board 410 spaced apart from the antenna array 430. The PMIC 454 may receive a voltage from a main PCB (not illustrated) to provide power necessary for various components (e.g., the RFIC 452) on the antenna module.

The shielding member 490 may be disposed at a portion (e.g., the second surface) of the printed circuit board 410 to electromagnetically shield at least one of the RFIC 452 or the PMIC 454. According to an example embodiment, the shield member 490 may include, for example, and without limitation, a shield can.

Although not shown, in various embodiments, the third antenna module 246 may be electrically connected to another printed circuit board (e.g., main circuit board) through a module interface. The module interface may include a connecting member, for example, a coaxial cable connector, board to board connector, interposer, or flexible printed circuit board (FPCB). The RFIC 452 and/or the PMIC 454 of the antenna module may be electrically connected to the printed circuit board through the connection member.

Figure 4B:
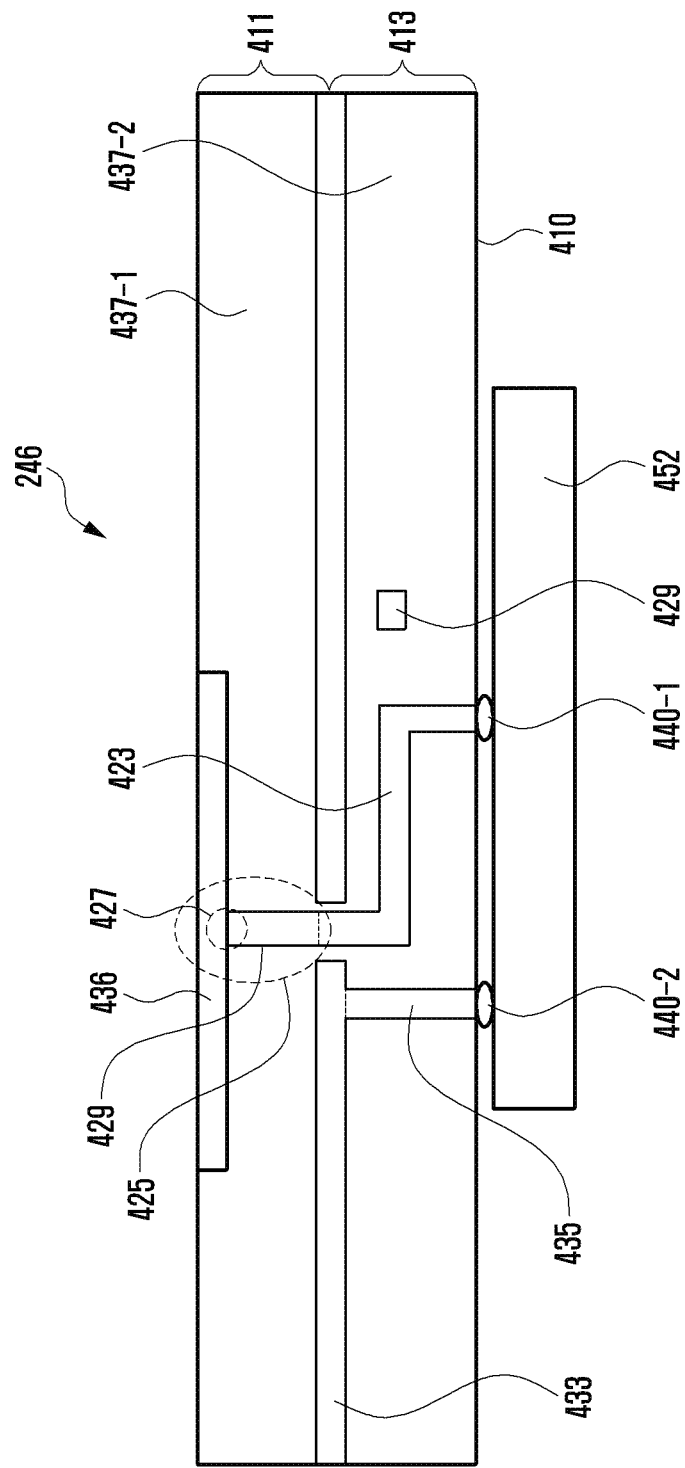
FIG. 4B is a cross section of the third antenna module taken along line Y-Y' in (a) of FIG. 4A according to various embodiments.

FIG. 4B is a cross-sectional view illustrating the example third antenna module 246 taken along line Y-Y' of FIG. 4A(a) according to various embodiments of the disclosure. The printed circuit board 410 of the illustrated embodiment may include an antenna layer 411 and a network layer 413.

With reference to FIG. 4B, the antenna layer 411 may include at least one dielectric layer 437-1, and an antenna element 436 and/or a power feeding portion 425 formed on or inside an outer surface of a dielectric layer. The power feeding portion 425 may include a power feeding point 427 and/or a power feeding line 429.

The network layer 413 may include at least one dielectric layer 437-2, at least one ground layer 433, at least one conductive via 435, a transmission line 423, and/or a power feeding line 429 formed on or inside an outer surface of the dielectric layer.

Further, in the illustrated embodiment, the RFIC 452 (e.g., the third RFIC 226 of FIG. 2) of FIG. 4A(c) may be electrically connected to the network layer 413 through, for example, first and second solder bumps 440-1 and 440-2. In other embodiments, various connection structures (e.g., solder or ball grid array (BGA)) instead of the solder bumps may be used. The RFIC 452 may be electrically connected to the antenna element 436 through the first solder bump 440-1, the transmission line 423, and the power feeding portion 425. The RFIC 452 may also be electrically connected to the ground layer 433 through the second solder bump 440-2 and the conductive via 435. Although not illustrated, the RFIC 452 may also be electrically connected to the above-described module interface through the power feeding line 429.

Figure 5:
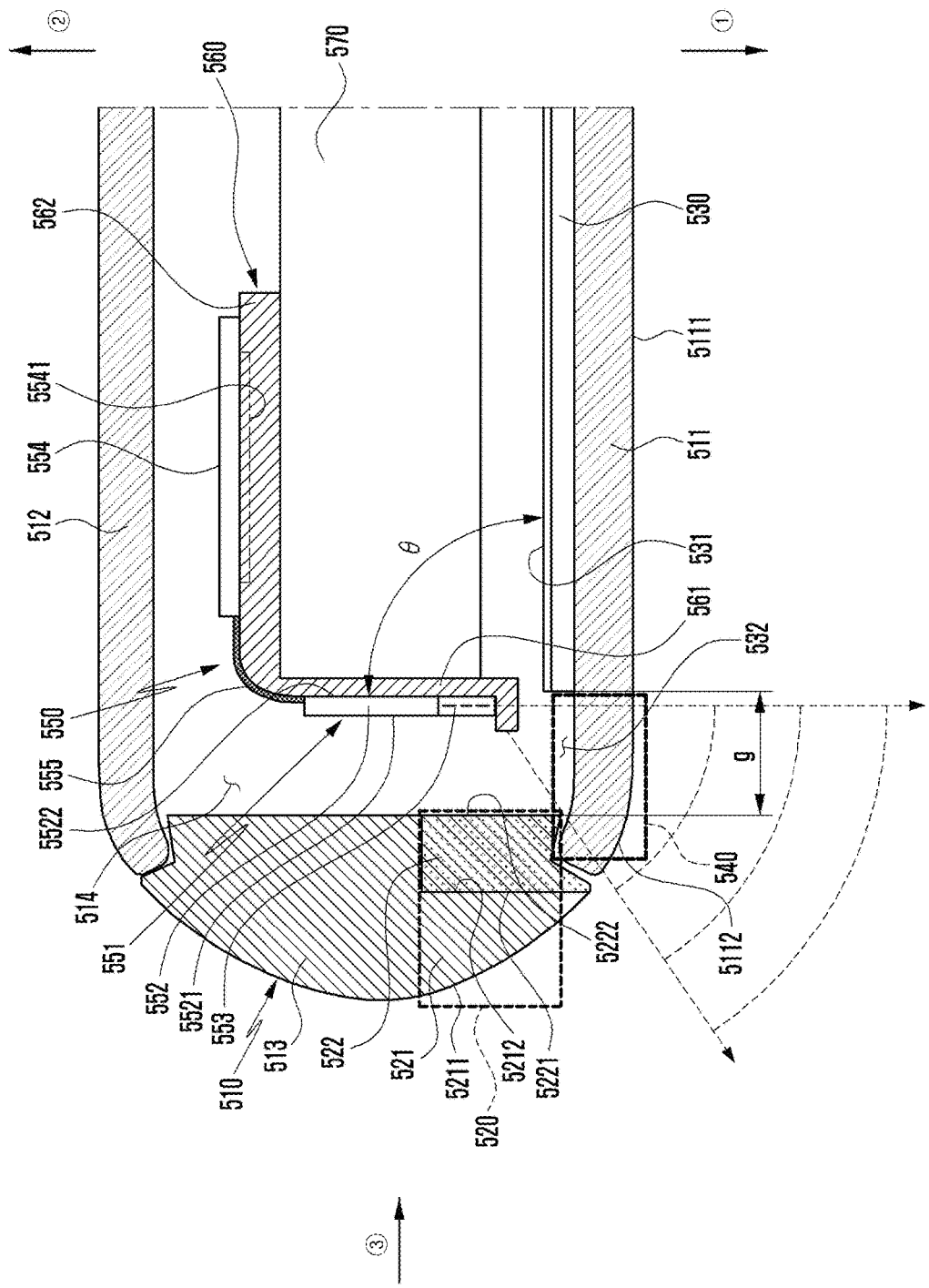
FIG. 5 is a sectional illustrating various parts of an example electronic device according to various embodiments.

FIG. 5 is a sectional view illustrating various parts of an example electronic device 500 according to various embodiments of the disclosure.

The electronic device 500 of FIG. 5 is at least partially similar to the electronic device 101 of FIG. 1 or the electronic device 300 of FIG. 3A or may include other embodiments of the electronic device.

Referring to FIG. 5, the electronic device 500 may include a housing 510, including a first plate 511 facing a first direction (e.g., direction ①) (e.g., the z direction of FIG. 3A), a second plate 512 facing a second direction (e.g., direction ②) (e.g., the –z direction of FIG. 3A) opposite the first plate 511, and a side member (e.g., a side housing or bezel) 513 surrounding the space 514 between the first plate 511 and the second plate 512. According to an example embodiment, the first plate 511 may include a planar part 5111 and a curved part 5112 bent from the planar part 5111 and extending up to the side member 513. Although not illustrated, the second plate 512 may include a planar part and a curved part bent from the planar part and extending up to the side member 513. According to an example embodiment, the electronic device 500 may include a display 530 positioned in the internal space 514. According to an example embodiment, the display 530 may include a touch screen display. According to an example embodiment, the display 530 may be positioned so that it is seen from the outside through at least some area of the first plate 511. According to an example embodiment, the display 530 may include a conductive plate 531 positioned for the purpose of noise shielding and insulation. According to an example embodiment, the conductive plate 530 may include a Cu sheet having an attachable film form. According to an example embodiment, when the first plate 511 is viewed from above, the edge 532 of the display 530 may have a gap "g" from the first portion 520 of the side member 513. According to an example embodiment, the gap "g" may be covered by the peripheral portion 540 of the first plate 511. According to an example embodiment, the peripheral portion 540 of the first plate 511 may include the curved part 5112 or may include a part of the planar part 5111 and the curved part 5112 together.

According to various embodiments, the side member 513 may include an external metal part 521 at least formed in the first portion 520 and an internal polymer part 522 (e.g., a non-conductive part or a non-conductive area) extending from the external metal part 521. According to an example embodiment, the external metal part 521 and the internal polymer part 522 may be integrated as a part of the side member 513 made of a conductive material through, for example, dual injection or insert injection. According to an example embodiment, the external metal part 521 may include a first face 5211 facing the outside of the electronic device 500 and a second face 5212 facing the internal space 514 of the electronic device 500. According to an example embodiment, the internal polymer part 522 may include a third face 5221 contacting the second face 5212 and a fourth face 5222 facing the internal space 514.

According to various embodiments, the electronic device 500 may include an antenna module 550 positioned in the internal space 514. According to an example embodiment, the antenna module 550 may include an antenna structure 551 positioned in the internal space 514 of the electronic device 500. According to an example embodiment, the antenna structure 551 may include a substrate 552, a printed circuit board (PCB) 554 spaced apart from the substrate 552, and a conductive cable 555 (e.g., a flexible printed circuit board (FPCB)) positioned to electrically connect the substrate 552 and the PCB 554. According to an example embodiment, the PCB 554 may include a plurality of conductive patches (e.g., conductive patches 5542, 5542-1, and 5542-2 of FIG. 6) to be described in greater detail below. According to an example embodiment, the PCB 554 may include a wireless communication circuitry 5541 positioned on at least one surface thereof. According to an example embodiment, the wireless communication circuitry 5541 may be configured to transmit and/or receive a radio frequency of about a 3 GHz~100 GHz range through the antenna structure 551.

According to various embodiments, the antenna module 550 may be supported through a support member 560 positioned in the internal space 514 of the electronic device 500. According to an example embodiment, the support member 560 may be made of a dielectric material (e.g., PC) and may be formed in various manners depending on an arrangement structure of the antenna structure 551. According to an example embodiment, the antenna structure 551 may help the improvement of radiation performance by providing a separation distance from a conductive electronic part 570 (e.g., a speaker device or the microphone device), positioned on the periphery, through the dielectric. According to an example embodiment, the support member 560 may include a first support 561 supporting the substrate 552 and a second support 562 supporting the PCB 554. According to an example embodiment, the first support 561 and the second support 562 may be integrated. The first support 561 may be formed in a shape to determine an angle θ between the substrate 552 and the display 530.

According to various embodiments, the substrate 552 may include a fifth face 5521 facing the side member 513 and a sixth face 5522 facing a direction opposite the fifth face 5521. According to an example embodiment, the substrate 552 may be positioned so that the fifth face 5521 is substantially parallel to the second face 5212. According to an example embodiment, the substrate 552 may be positioned so that the sixth face 5522 substantially has a given angle θ to the display 530. According to an example embodiment, the angle θ may include a right angle. According to an example embodiment, the angle θ may include an acute angle. According to an example embodiment, the substrate 552 may include a rigid PCB or FPCB. According to an example embodiment, the substrate 552 may include at least one conductive pattern 553 positioned in the space between the fifth face 5521 and the sixth face 5522. In another embodiment, the at least one conductive pattern 553 may be positioned on the fifth face 5521 and/or the sixth face 5522. According to an example embodiment, when the first plate 511 is viewed from above, the at least one conductive pattern 553 may be positioned at a location overlapping at least part of the peripheral portion 540 of the first plate 511. According to an example embodiment, when the side member 513 is viewed from above (e.g., direction ③), the at least one conductive pattern 553 may be positioned at a location overlapping at least part of the internal polymer part 522 of the first portion 520. According to an example embodiment, if a plurality of conductive patches (e.g., the conductive patches 5542, 5542-1, and 5542-2 of FIG. 6) are not included in the PCB 554, the antenna structure 551 may include only the substrate 552 including the at least one conductive pattern 553.

According to various embodiments, the wireless communication circuitry 5541 is electrically connected to the at least one conductive pattern 553 through the conductive cable 555, thus being capable of forming a directivity beam at least partially. According to an example embodiment, the wireless communication circuitry 5541 may form beam coverage in a direction including the direction (e.g., direction ①) toward which at least the front plate 511 is directed through the at least one conductive pattern 553.

Figure 6:
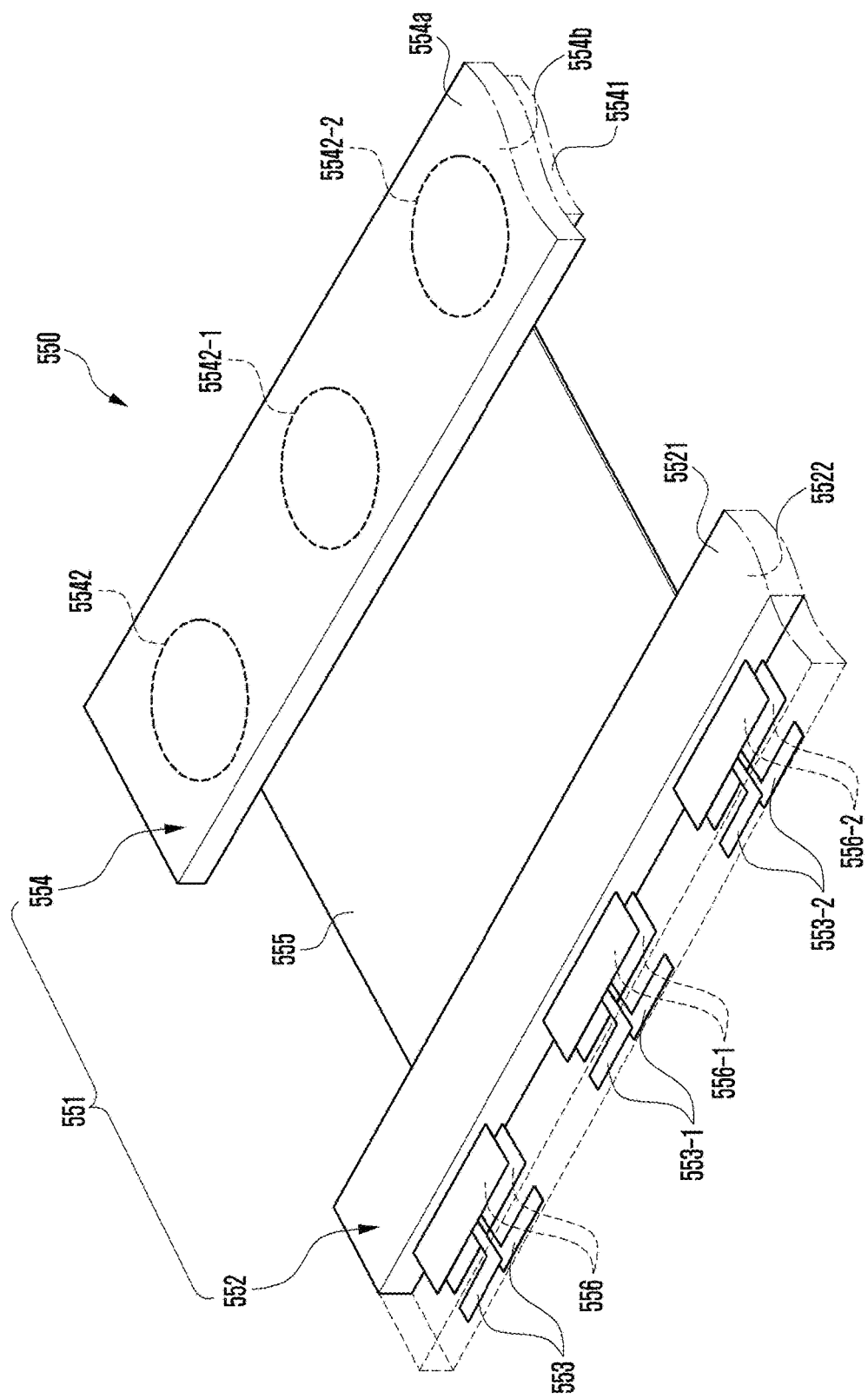
FIG. 6 is a perspective view illustrating the example antenna module of FIG. 5 according to various embodiments.

FIG. 6 is a perspective view illustrating the example antenna module 550 of FIG. 5 according to various embodiments of the disclosure.

The antenna module 550 of FIG. 6 is at least partially similar to the third antenna module 246 of FIG. 2 or may include other embodiments of the antenna module.

Referring to FIG. 6, the antenna module 550 may include the antenna structure 551. According to an example embodiment, the antenna structure 551 may include the substrate 552, the PCB 554 spaced apart from the substrate 552, and the conductive cable 555 (e.g., FPCB) positioned to electrically connect the PCB 554 and the antenna structure 551. According to an example embodiment, the PCB 554 may include the wireless communication circuitry 5541 positioned on at least one surface thereof.

According to various embodiments, the substrate 552 may include a plurality of conductive patterns 553, 553-1, and 553-2 disposed in the space between the fifth face 5521 and the sixth face 5522. According to an example embodiment, the conductive patterns 553, 553-1, and 553-2 may include, for example, dipole antennas disposed symmetrically on the left and right sides of a virtual center line. According to an example embodiment, the substrate 552 may include pairs of conductive patches 556, 556-1, and 556-2 separated and positioned with the conductive patterns 553, 553-1, and 553-2 forming pairs interposed therebetween in the space between the fifth face 5521 and the sixth face 5522. According to an example embodiment, each of the pairs of conductive patches 556, 556-1, and 556-2 may have one side fed with power and the other side (−) fed with power or electrically connected to the ground, thus being capable of operating as a patch antenna. Accordingly, the plurality of conductive patterns 553, 553-1, and 553-2 that form pairs and the plurality of conductive patches 556, 556-1, and 556-2 disposed at locations corresponding to the conductive patterns 553, 553-1, and 553-2 and forming pairs may form beam patterns in the same direction. According to an example embodiment, an antenna disposed in the substrate 552 may operate as a dual polarization antenna, including the conductive patterns 553, 553-1, and 553-2 forming horizontal polarization and the conductive patches 556, 556-1, and 556-2 forming vertical polarization. According to an example embodiment, the wireless communication circuitry 5541 may be configured to transmit and/or receive a radio frequency of about a 3 GHz~100 GHz range through the conductive patterns 553, 553-1, and 553-2 and/or the conductive patches 556, 556-1, and 556-2.

According to various embodiments, the PCB 554 may include a first face 554a and a second face 554b facing a direction opposite the first face 554a. According to an example embodiment, the wireless communication circuitry 5541 may be positioned in the second face 554b. According to an example embodiment, the PCB 554 may include a plurality of conductive patches 5542, 5542-1, and 5542-2 disposed in the first face 554a. According to an example embodiment, the wireless communication circuitry 5541 may be configured to transmit and/or receive a radio frequency of about a 3 GHz~100 GHz range through the conductive patch 5542.

According to various embodiments, the antenna module 550 electrically connects the substrate 552 and the PCB 554 through the conductive cable 555 having flexibility, and thus the degree of freedom of mounting can be secured. According to an example embodiment, the antenna module 550 may be positioned so that the directions of beam patterns formed by the conductive patches 5542, 5542-1, and 5542-3 of the PCB 554 and the conductive patterns 553, 553-1, and 553-2 of the substrate 552 through the conductive cable 555 are different. According to an example embodiment, the PCB 554 may be positioned so that a beam pattern is formed in a direction (e.g., the direction ② of FIG. 5) toward which the rear plate (e.g., the second plate 512 of FIG. 5) of the electronic device is directed, for example, in the internal space (e.g., the internal space 514 of FIG. 5) of an electronic device (e.g., the electronic device 500 of FIG. 5). According to an example embodiment, the substrate 552 may be positioned so that a beam pattern is formed in a direction (e.g., the direction ① of FIG. 5) toward which the front plate (e.g., the first plate 511 of FIG. 5) of an electronic device (e.g., the electronic device 500 of FIG. 5) is directed, for example, in the internal space (e.g., the internal space 514 of FIG. 5) of the electronic device. Although not illustrated, in the wireless communication circuitry 5541, the conductive patches 5542, 5542-1, and 5542-2, the conductive patterns 553, 553-1, and 553-2 forming pairs and/or the conductive patch 556, 556-1, and 556-2 forming pairs may be dually fed with power.

According to various embodiments, the conductive patterns 553, 553-1, and 553-2 forming pairs, the conductive patches 556, 556-1, and 556-2 forming pairs, and the conductive patches 5542, 5542-1, and 5542-2 may be 2 or 4 or more in number.

Figure 7:
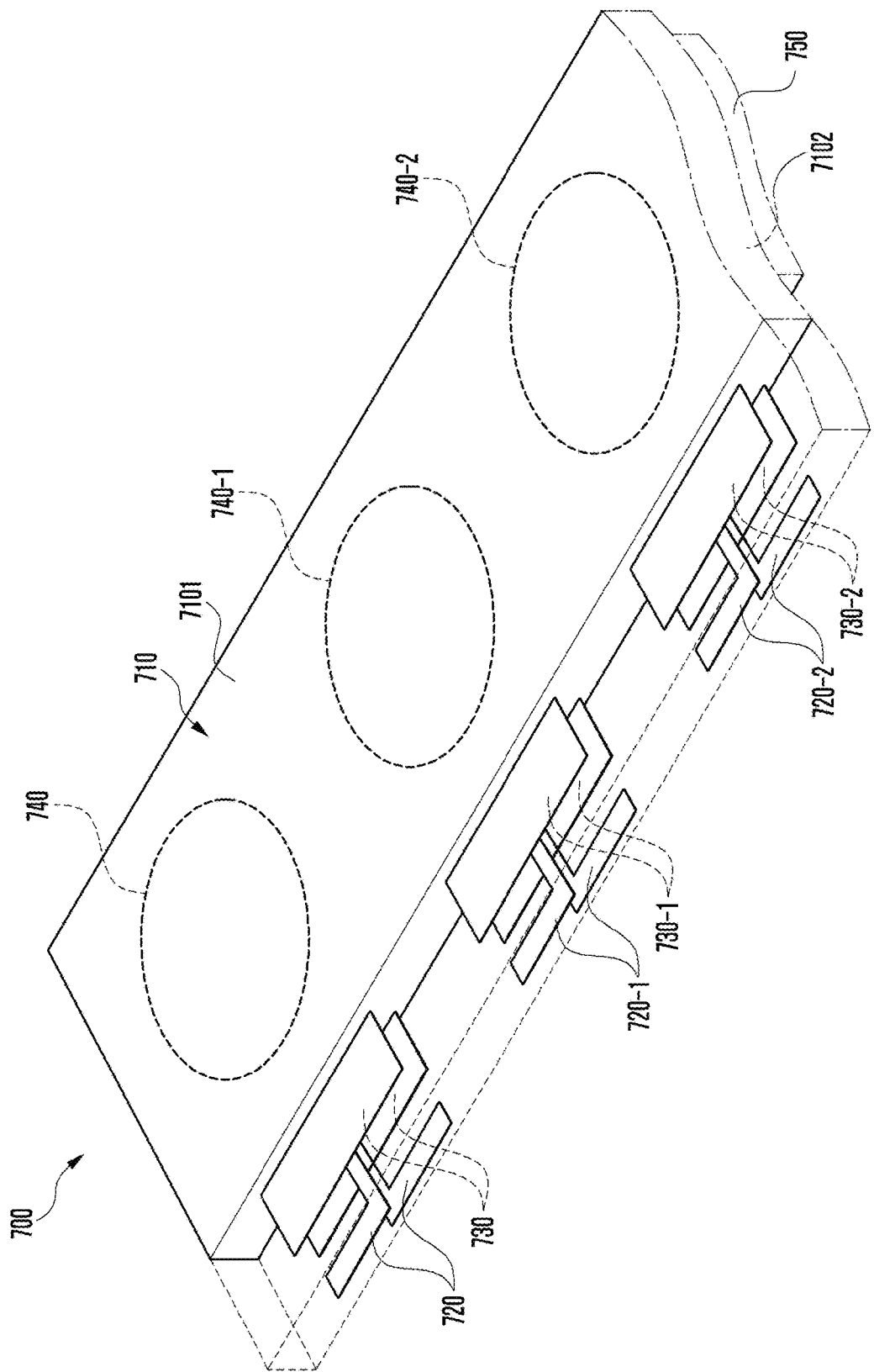
FIG. 7 is a perspective view illustrating the example antenna module according to various embodiments.

FIG. 7 is a perspective view illustrating an example antenna module 700 according to various embodiments of the disclosure.

The antenna module 700 of FIG. 7 is at least partially similar to the third antenna module 246 of FIG. 2 or may include other embodiments of the antenna module.

Referring to FIG. 7, the antenna module 700 may include a substrate 710, including a first face 7101 and a second face 7102 facing a direction opposite the first face 7101. According to an example embodiment, the antenna module 700 may include at least one of conductive patterns 720, 720-1, and 720-2 (e.g., the conductive patterns 553, 553-1, and 553-2 of FIG. 6) disposed in the space between the first face 7101 and the second face 7102 and conductive patches 730, 730-1, and 730-2 forming pairs (e.g., the conductive patches 556, 556-1, and 556-2 forming pairs in FIG. 6) disposed with the conductive patterns 720, 720-1, and 720-2 forming pairs interposed therebetween in at least part of the edge area of the substrate 710. For another example, the antenna module 700 may include conductive patches 740, 740-1, and 740-2 disposed inside or within the first face 7101 of the substrate 710. According to an example embodiment, the antenna module 700 may include a wireless communication circuitry 750 positioned in the second face 7102 of the substrate 710. According to an example embodiment, the wireless communication circuitry 750 may be configured to transmit and/or receive a radio frequency of about a 3 GHz~100 GHz range through the conductive patterns 720, 720-1, and 720-2 forming pairs, the conductive patches 730, 730-1, and 730-2 forming pairs and/or the conductive patches 740, 740-1, and 740-2.

According to various embodiments, unlike in the case of FIG. 6, the conductive patches 740, 740-1, and 740-2 of the antenna module 700 may be disposed in a single substrate 710 along with the conductive patterns 720, 720-1, and 720-2 without a separate conductive cable. The antenna module 700 may be substituted with the antenna module 550 positioned in the internal space of the electronic device 500 of FIG. 5.

According to various embodiments, the conductive patterns 720, 720-1, and 720-2 forming pairs, the conductive patches 730, 730-1, and 730-2 forming pairs, and the conductive patches 740, 740-1, and 740-2 may be 2 or 4 or more in number.

Figure 8:
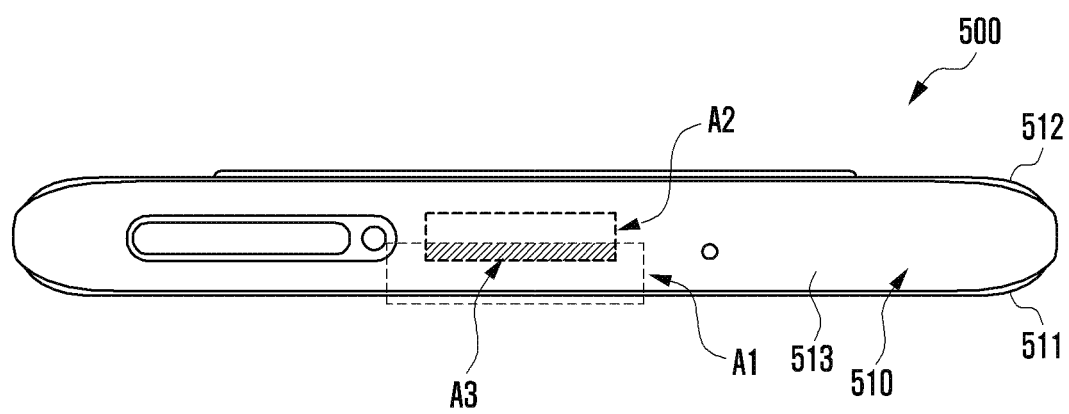
FIG. 8 is a diagram illustrating an example arrangement relation of an antenna structure in the example electronic device according to various embodiments.

FIG. 8 is a diagram illustrating an example arrangement relation of an antenna structure in the electronic device 500 according to various embodiments of the disclosure.

Referring to FIG. 8, when the side member 513 is viewed from above, the electronic device 500 may include an overlap area A3 in which at least part of an arrangement area A1 having an internal polymer part (e.g., the internal polymer part 522 of FIG. 5) positioned therein overlaps at least part of an arrangement area A2 having a substrate (e.g., the substrate 552 of FIG. 5) positioned therein. According to an example embodiment, when the side member 513 is viewed from above, a substrate (e.g., the substrate 552 of FIG. 5) may be positioned so that at least one conductive pattern (e.g., the conductive pattern 553 of FIG. 5) is included in the overlap area A3. Accordingly, the substrate (e.g., the substrate 552 of FIG. 5) is positioned so that a separation distance from the external metal part 521 of the side member 513 is increased by the internal polymer part (e.g., the internal polymer part 522 of FIG. 5). Accordingly, a beam pattern can be formed in a direction (e.g., the direction ① of FIG. 5) toward which the front plate 511 is directed through the first peripheral portion 540.

Figure 9:
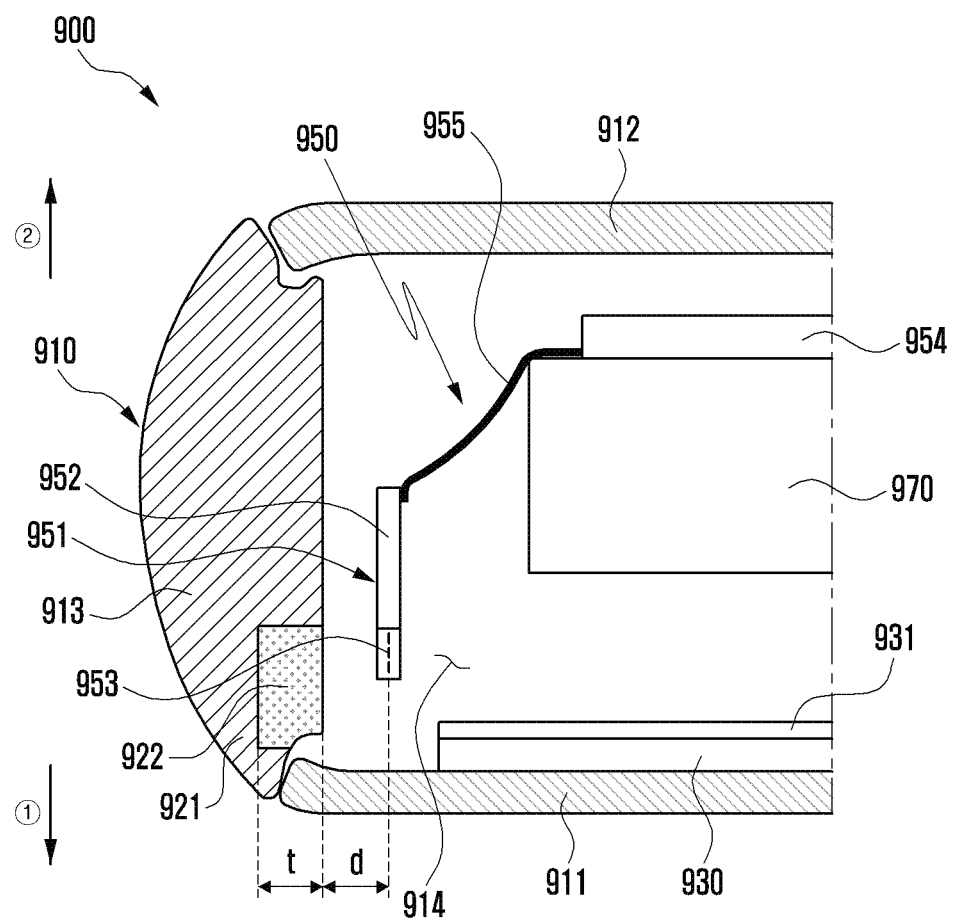
FIG. 9 is a sectional view illustrating an example electronic device according to various embodiments.

FIG. 9 is a sectional view illustrating an example electronic device 900 according to various embodiments of the disclosure.

The electronic device 900 of FIG. 9 is at least partially similar to the electronic device 101 of FIG. 1, the electronic device 300 of FIG. 3A or the electronic device 500 of FIG. 5 or may include other embodiments of the electronic device.

Referring to FIG. 9, the electronic device 900 may include a housing 910, including a first plate 911 facing a first direction (e.g., direction ①), a second plate 912 facing a second direction (e.g., direction ②) opposite the first plate 911, and a side member 913 surrounding a space 914 between the first plate 911 and the second plate 912. According to an example embodiment, the electronic device 900 may include a display 930 positioned in the internal space 914. According to an example embodiment, the display 930 may include a conductive plate 931 positioned for the purpose of noise shielding and insulation. According to an example embodiment, the electronic device 900 may include at least one electronic part 970 positioned in the internal space 914.

According to various embodiments, the electronic device 900 may include an antenna module 950 positioned in the internal space 914. According to an example embodiment, the antenna module 950 may include an antenna structure 951 positioned in the internal space 914. According to an example embodiment, the antenna structure 951 may include a substrate 952, a PCB 954 spaced apart from the substrate 952, and a conductive cable 955 electrically connecting the substrate 952 and the PCB 954. According to an example embodiment, the side member 913 may include an external metal part 921 and an internal polymer part 922 extending from the external metal part 921. According to an embodiment of the disclosure, the arrangement relation of the substrate 952 for the internal polymer part 922 is substantially the same as the arrangement relation of FIG. 5, and thus a detailed description thereof will not be repeated here.

According to various embodiments, the antenna module 950 may have varying performance when the thickness "t" of the internal polymer part 922 is changed in a direction parallel to the first plate 911 in the state in which a distance "d" between the at least one conductive pattern 953 of the substrate 952 and the internal polymer part 922 has been determined.

Figure 10:
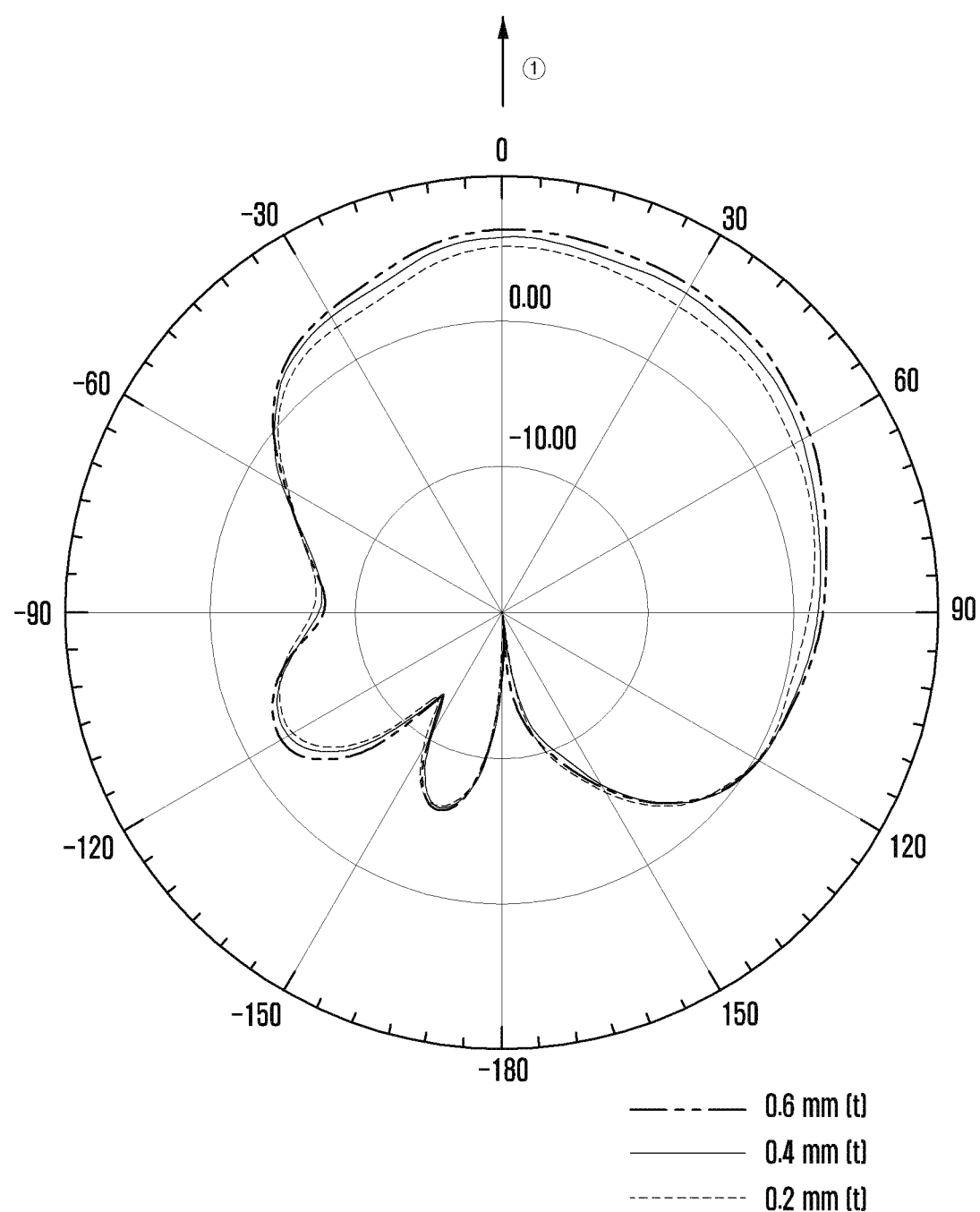
FIG. 10 is a diagram illustrating a radiation pattern of the example antenna module according to a change in the thickness of a polymer member in the electronic device of FIG. 9 according to various embodiments.

FIG. 10 is a diagram illustrating an example radiation pattern of the antenna module 900 according to a change in the thickness "t" of the polymer member 922 in the electronic device of FIG. 9 according to various embodiments of the disclosure. As illustrated in FIG. 10, beam coverage performance of the antenna module 900 in a front plate direction (e.g., direction ①) becomes excellent as the thickness of the internal polymer part 922 is thicker.

Figure 11:
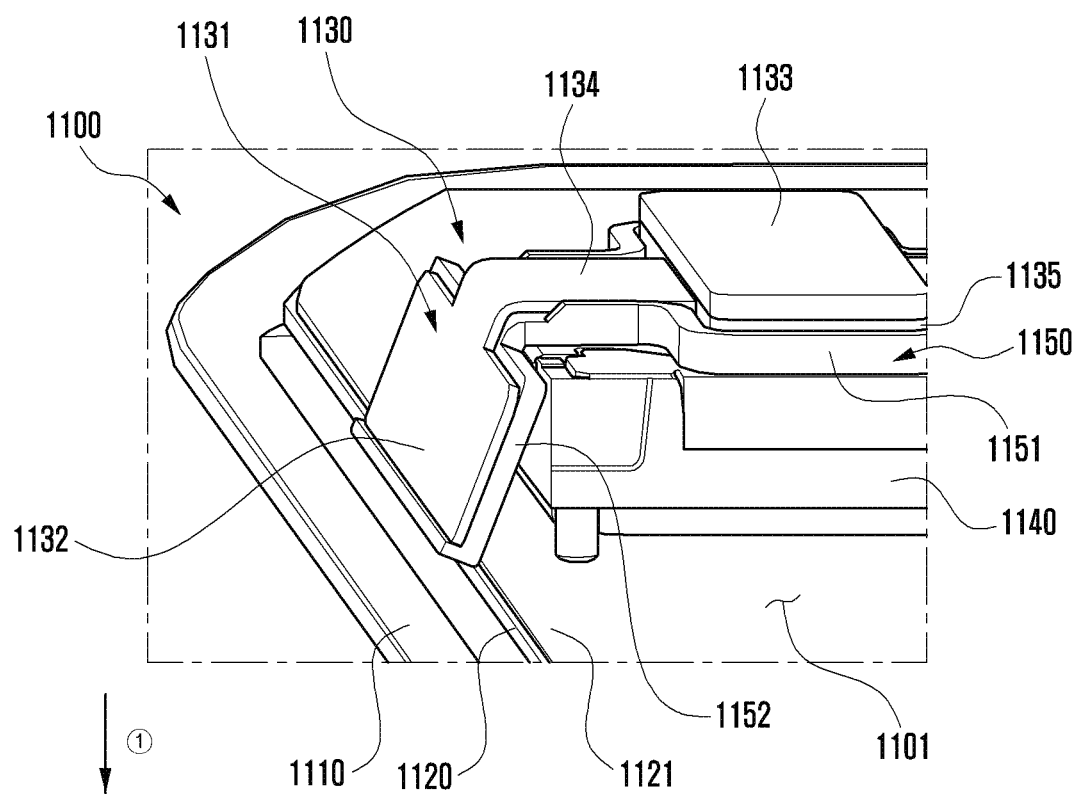
FIG. 11 is a perspective view illustrating an example arrangement relation of an example antenna structure in an electronic device according to various embodiments.

FIG. 11 is a perspective view illustrating an example arrangement relation of an antenna structure 1131 in an electronic device 1100 according to various embodiments of the disclosure.

The electronic device 1100 of FIG. 11 is at least partially similar to the electronic device 101 of FIG. 1 or the electronic device 300 of FIG. 3A or may include other embodiments of the electronic device.

Referring to FIG. 11, the electronic device 1100 may include a first plate 1110 and a display 1120 including a conductive plate 1121 positioned in the first plate 1110. According to an example embodiment, the electronic device 1100 may include an antenna module 1130 positioned in an internal space 1101. According to an example embodiment, the antenna module 1130 may include the antenna structure 1131. According to an example embodiment, the antenna structure 1131 may include a substrate 1132 positioned on the periphery of the display 1120 and a PCB 1133 spaced apart from the substrate 1132 at a given interval and electrically connected thereto by a conductive cable 1134. According to an example embodiment, the PCB 1133 may include a wireless communication circuitry 1135. According to an example embodiment, the location of the antenna module 1130 may be fixed through a support member 1150 made of a dielectric material and positioned in the internal space 1101 of the electronic device 1100. The support member 1150 may include a first support 1152 and/or a second support 1151. According to an example embodiment, the substrate 1132 may be positioned to have a given angle θ to the display 1120 through the structural shape of the first support 1152. According to an example embodiment, the PCB 1133 may be positioned to face the first plate 1110 through the structural shape of the second support 1151 of the support member 1150. According to an example embodiment, a beam pattern can be formed around the display 1120 through the first plate 1110 because the substrate 1132 is positioned to have an acute angle to the first plate 1110.

Figure 12:
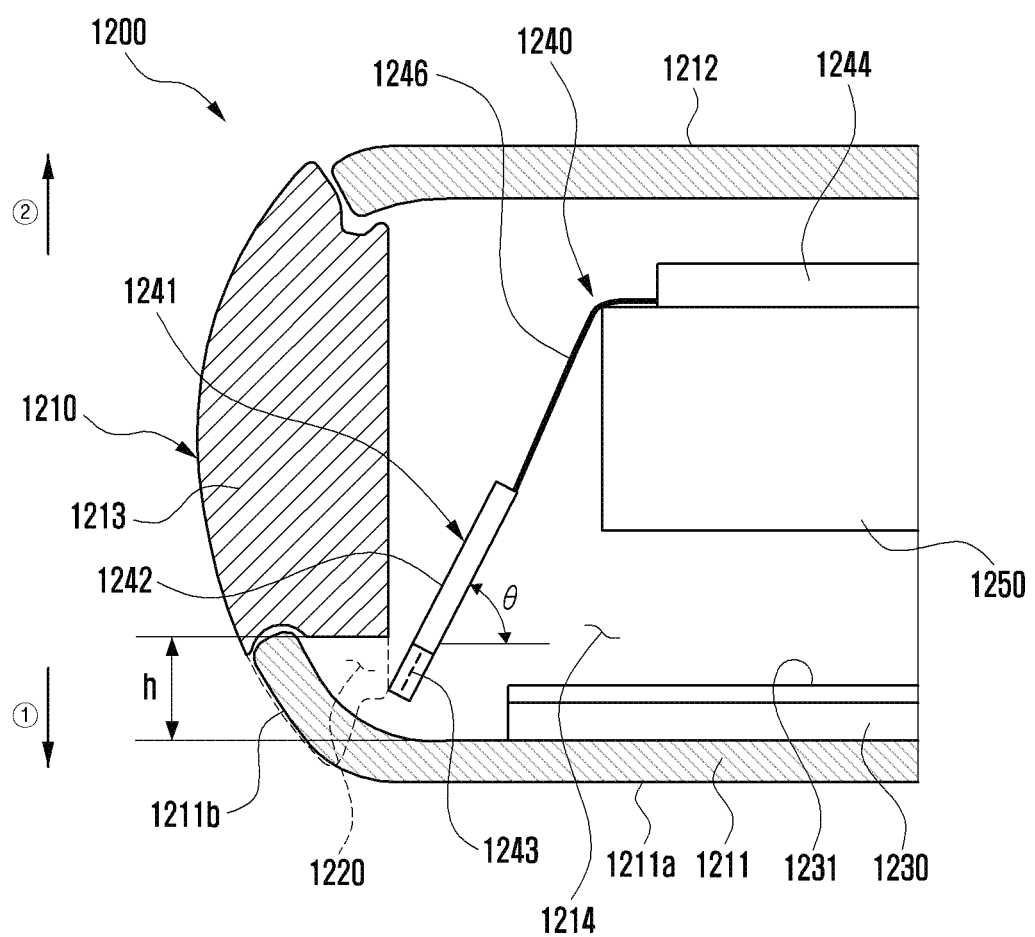
FIG. 12 is a sectional view illustrating an example electronic device according to various embodiments.

FIG. 12 is a sectional view illustrating an example electronic device 1200 according to various embodiments of the disclosure.

The electronic device 1200 of FIG. 12 is at least partially similar to the electronic device 101 of FIG. 1, the electronic device 300 of FIG. 3A or the electronic device 1100 of FIG. 11 or may include other embodiments of the electronic device.

Referring to FIG. 12, the electronic device 1200 may include a housing 1210, including a first plate 1211 facing a first direction (e.g., direction ①), a second plate 1212 facing a second direction (e.g., direction ②) opposite the first plate 1211, and a side member 1213 surrounding a space 1214 between the first plate 1211 and the second plate 1212. According to an example embodiment, the first plate 1211 may include a planar part 1211a and a curved part 1211b extending from the planar part 1211a to the side member 1213. According to an example embodiment, the electronic device 1200 may include a display 1230 positioned in an internal space 1214. According to an example embodiment, the display 1230 may be positioned so that it can be seen from the outside through at least some area of the first plate 1211. According to an example embodiment, the display 1230 may include a conductive plate 1231 positioned for the purpose of noise shielding and insulation. According to an example embodiment, the electronic device 1210 may include at least one electronic part 1250 positioned in the internal space 1214.

According to various embodiments, the electronic device 1200 may include an antenna module 1240 positioned in the internal space 1214. According to an example embodiment, the antenna module 1240 may include an antenna structure 1241 positioned in the internal space 1214 of the electronic device 1200. According to an example embodiment, the antenna structure 1241 may include a substrate 1242, a PCB 1244 spaced apart from the substrate 1242 at a given interval, and a conductive cable 1246 electrically connecting the substrate 1242 and the PCB 1244. According to an example embodiment, the substrate 1242 may be positioned slantly at a given angle θ to the first plate 1211. According to an example embodiment, a part 1220 that belongs to the side member 1213 and that comes in contact with the first plate 1211 may be omitted by a given height "h" in a direction (e.g., direction ②) toward which the second plate 1212 is directed. In such a case, the curved part 1211b of the first plate 1211 may be extended up to the side member 1213 in such a way to cover the omitted part 1220. In this case, there may be an effect in that the arrangement area of the display 1230 of the electronic device 1200 is extended.

According to various embodiments, the antenna module 1240 may have varying beam coverage when the height "h" of the part 1220 omitted in the direction (e.g., direction ②) toward which the second plate 1212 is directed is changed in the state in which the distance between at least one conductive pattern 1243 of the substrate 1242 and the side member 1213 has been determined.

Figure 13:
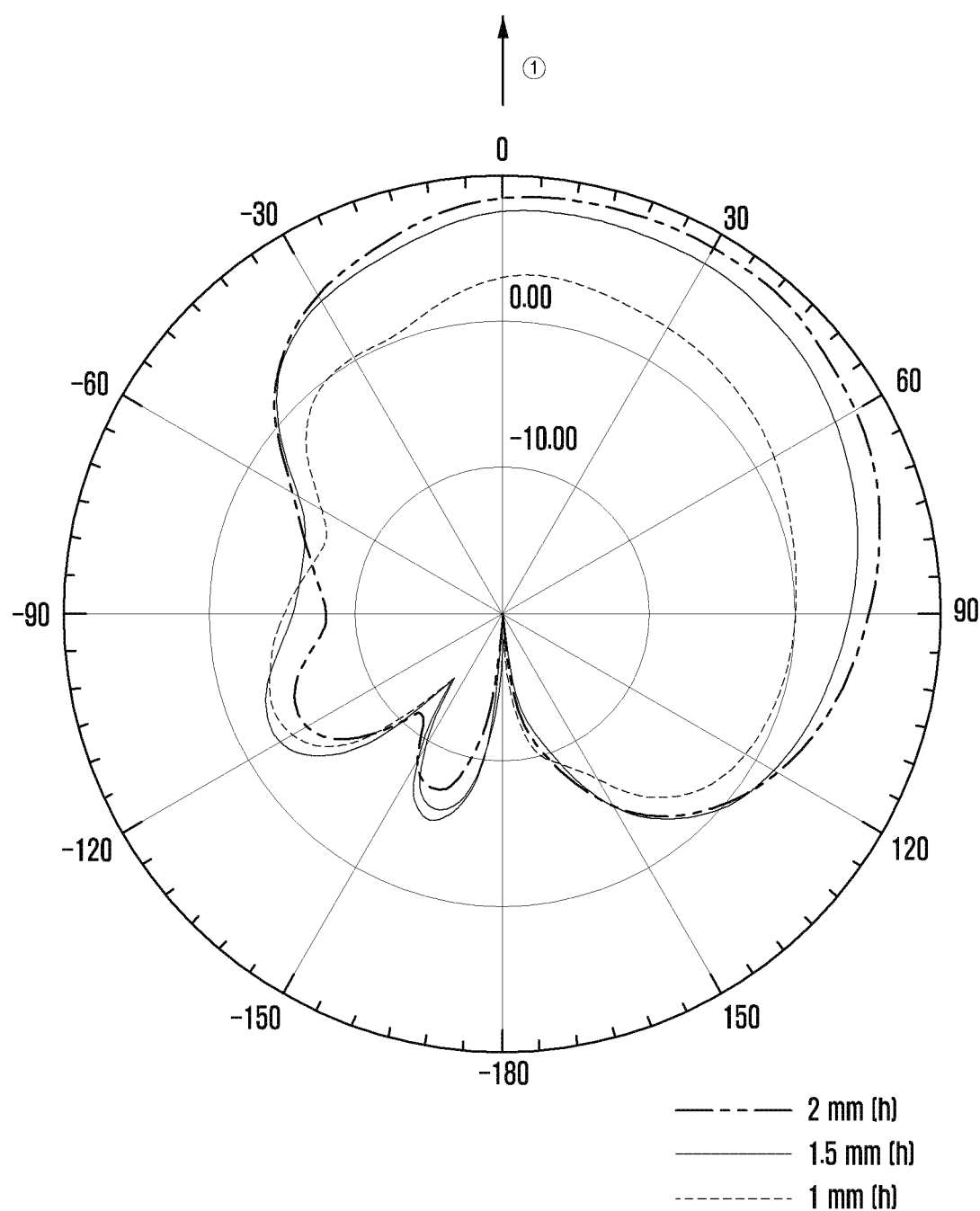
FIG. 13 is a diagram illustrating a radiation pattern of an example antenna module according to the omission area of a side member in the electronic device of FIG. 12 according to various embodiments.

FIG. 13 is a diagram illustrating an example radiation pattern of the antenna module 1240 according to the omission area 1220 of the side member 1213 in the electronic device 1200 of FIG. 12 according to various embodiments of the disclosure. As illustrated in FIG. 13, beam coverage performance of the antenna module 1240 in the direction (e.g., direction ①) toward which the front plate 1211 is directed becomes excellent as the height "h" of the omission part 1220 of the side member 1213 increases.

Figure 14A:
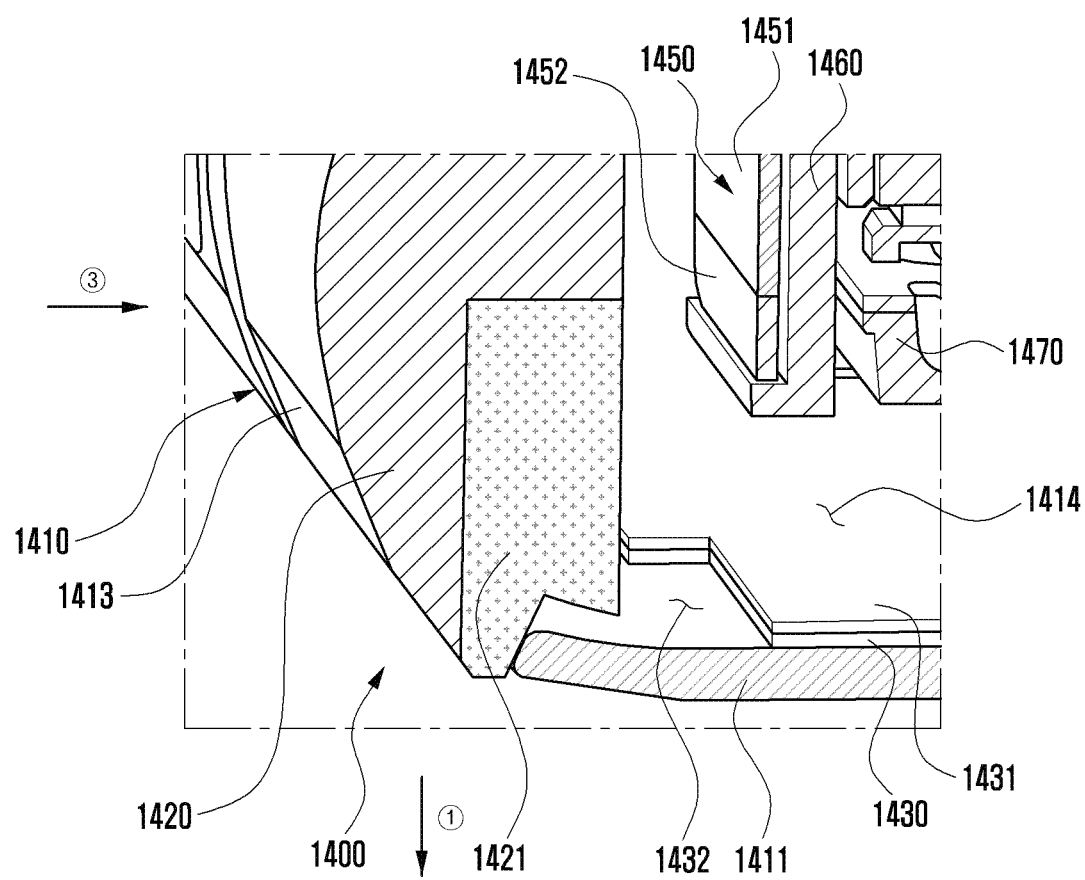
FIG. 14A is a perspective view illustrating various parts of an electronic device according to various embodiments.
Figure 14B:
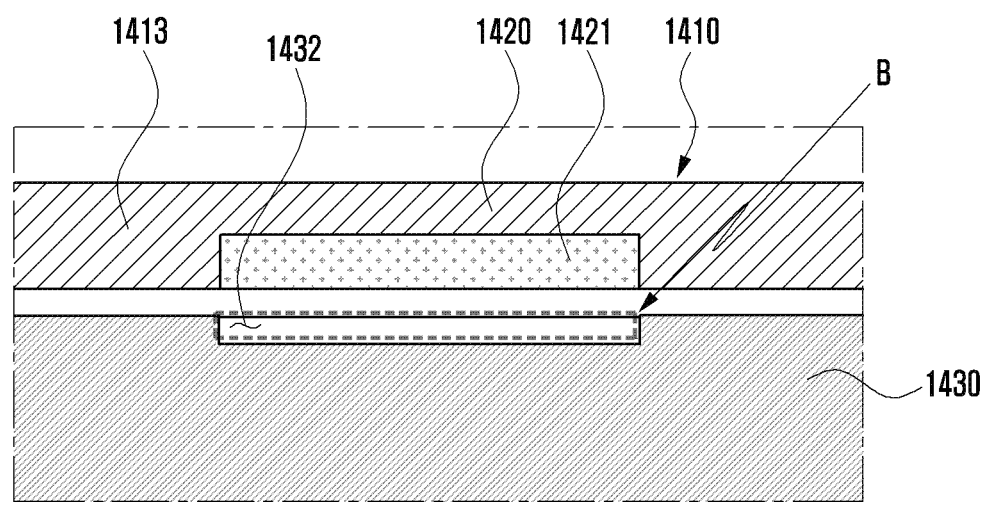
FIG. 14B is a sectional diagram illustrating an example arrangement relation between an example antenna structure and display of FIG. 14A according to various embodiments.

FIG. 14A is a perspective view illustrating various parts of an example electronic device 1400 according to various embodiments of the disclosure. FIG. 14B is a sectional diagram illustrating an arrangement relation between an antenna structure 1450 and display 1430 of FIG. 14A according to various embodiments of the disclosure.

The electronic device 1400 of FIG. 14A is at least partially similar to the electronic device 101 of FIG. 1, the electronic device 300 of FIG. 3A, the electronic device 500 of FIG. 5 or the electronic device 900 of FIG. 9 or may include other embodiments of the electronic device.

According to an example embodiment, according to the demands for a larger screen of the display 1430 positioned through the front plate 1411 (e.g., the first plate) of the electronic device 1400, the distance between the display 1430 and a side member 1413 is gradually narrowed. Accordingly, the arrangement location of the substrate 1451 of the antenna structure 1450 may be gradually narrowed. According to an embodiment of the disclosure, although the arrangement area of the display 1430 is extended in the internal space 1414 of the electronic device 1400, the mounting space of the substrate 1451 can be secured.

Referring to FIGS. 14A and 14B, the electronic device 1400 may include a housing 1410, including the first plate 1411 and the side member 1413 in which the first plate 1411 is positioned. According to an example embodiment, the side member 1413 may include an external metal part 1420 and an internal polymer part 1421. According to an example embodiment, the electronic device 1400 may include the display 1430 including a conductive plate 1431 positioned in the first plate 1411 in the internal space 1414. According to an example embodiment, the electronic device 1400 may include the antenna structure 1450 including at least one conductive pattern 1452 positioned in the internal space 1414 and formed through the substrate 1451. According to an example embodiment, the substrate 1451 may be positioned to be supported through a support member 1460 that is positioned to avoid a surrounding conductive electronic part 1470. According to an example embodiment, the substrate 1451 may be positioned so that the at least one conductive pattern 1452 overlaps at least some area of the internal polymer part 1421 when the side member 1413 is viewed from above (e.g., direction ③).

According to various embodiments, the display 1430 may include a cutting part 1432 from which at least part of an area (e.g., an area B of FIG. 14B) overlapping the at least one conductive pattern 1452 is omitted when the first plate 1411 is viewed from above. According to an example embodiment, the cutting part 1432 may be formed so that at least one of the conductive plate 1431 of the display 1430 and/or a display panel (not shown) is cut. According to an example embodiment, the cutting part 1432 may be included in the black matrix (BM) area of the display 1430. Accordingly, the at least one conductive pattern 1452 of the substrate 1451 may form a beam pattern in a direction (e.g., direction ①) toward which the first plate 1411 of the electronic device 1400 is directed through the cutting part 1432 of the display 1430.

Figure 15A:
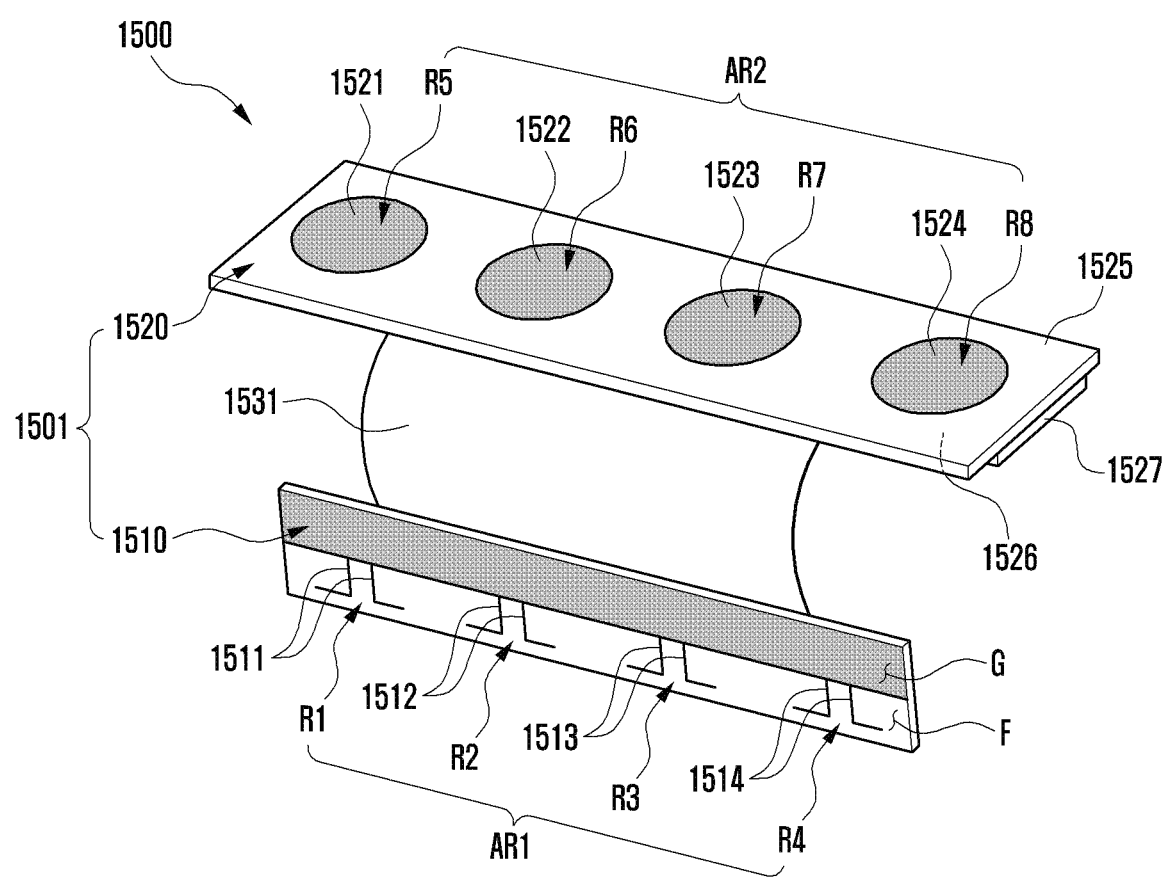
FIG. 15A is a perspective view illustrating an example first antenna module according to various embodiments.
Figure 15B:
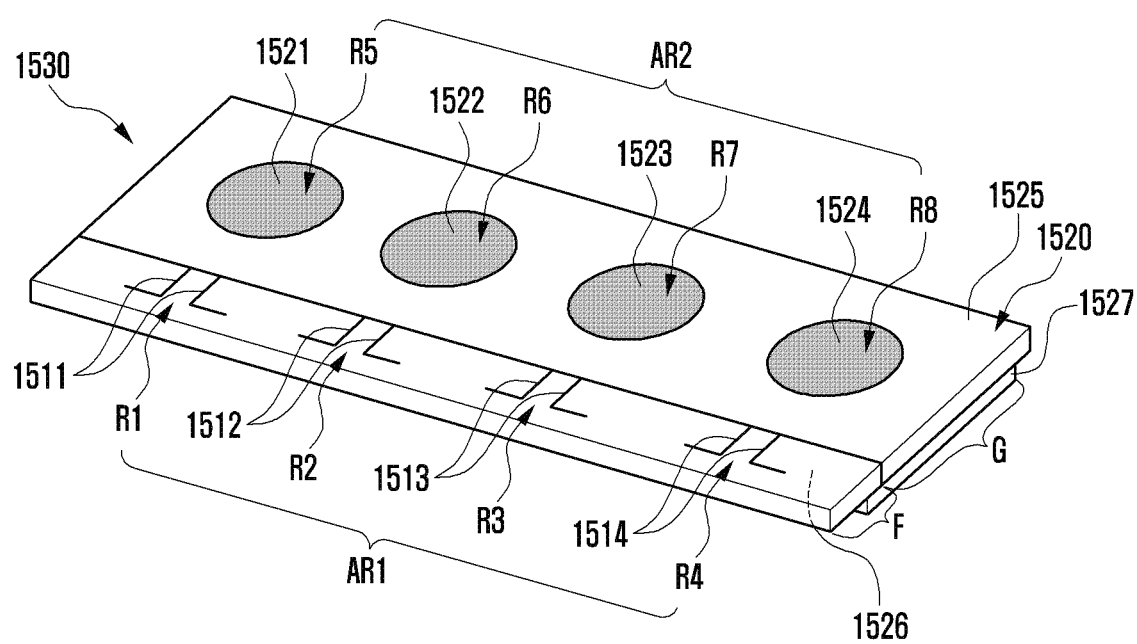
FIG. 15B is a perspective view illustrating an example second antenna module according to various embodiments.

FIG. 15A is a perspective view illustrating an example first antenna module 1500 according to various embodiments of the disclosure. FIG. 15B is a perspective view illustrating an example second antenna module 1530 according to various embodiments of the disclosure.

The first antenna module 1500 of FIG. 15A is at least partially similar to the third antenna module 246 of FIG. 2 or may include other embodiments of the antenna module.

The second antenna module 1530 of FIG. 15B is at least partially similar to the third antenna module 246 of FIG. 2 or may include other embodiments of the antenna module.

Referring to FIG. 15A, the first antenna module 1500 may include an antenna structure 1501. According to an example embodiment, the antenna structure 1501 may include a substrate 1510, a PCB 1520 spaced apart from the substrate 1510, and a conductive cable 1531 (e.g., FPCB) positioned to electrically connect the PCB 1520 and the substrate 1510.

According to various embodiments, the substrate 1510 may include a ground area G electrically connected thereto through the conductive cable and a peel-cut area F (e.g., non-conductive area) neighboring the ground area. According to an example embodiment, the substrate 1510 may include a first antenna array AR1 in which a plurality of antenna elements R1, R2, R3, and R4 is disposed at given intervals through the peel-cut area F. According to an example embodiment, the first antenna array AR1 may include a first antenna element R1, a second antenna element R2, a third antenna element R3 and/or a fourth antenna element R4. According to an example embodiment, the first antenna element R1 may include a first conductive pattern 1511. The second antenna element R2 may include a second conductive pattern 1512. The third antenna element R3 may include a third conductive pattern 1513. The fourth antenna element R4 may include a fourth conductive pattern 1514. According to an example embodiment, the first conductive pattern 1511, the second conductive pattern 1512, the third conductive pattern 1513 and the fourth conductive pattern 1514 may include a dipole radiator. According to an example embodiment, each of the first conductive pattern 1511, the second conductive pattern 1512, the third conductive pattern 1513 and the fourth conductive pattern 1514 may be at least partially similar to a pair of conductive patterns of FIG. 6 (e.g., the conductive pattern 553 of FIG. 6). According to an example embodiment, although not illustrated, the first antenna array AR1 may further include a pair of conductive patches illustrated in FIG. 6 (e.g., the pair of conductive patches 556 of FIG. 6). According to an example embodiment, the substrate 1510 may include the first antenna array AR1 in which the antenna elements R1, R2, R3, and R4 having a 1×4 array structure are disposed. In another embodiment, the substrate 1510 may include antenna arrays in which various numbers of antenna elements are disposed in various forms.

According to various embodiments, the PCB 1520 may include a first face 1525 and a second face 1526 facing a direction opposite the first face 1525. According to an example embodiment, the PCB 1520 may include a second antenna array AR2 in which a plurality of antenna elements R5, R6, R7, and R8 is disposed at given intervals on or within the first face 1525. According to an example embodiment, the second antenna array AR2 may include a fifth antenna element R5, a sixth antenna element R6, a seventh antenna element R7 and/or an eighth antenna element R8. According to an example embodiment, the fifth antenna element R5 may include a first conductive patch 1521. The sixth antenna element R6 may include a second conductive patch 1522. The seventh antenna element R7 may include a third conductive patch 1523. The eighth antenna element R8 may include a fourth conductive patch 1524. According to an example embodiment, the first conductive patch 1521, the second conductive patch 1522, the third conductive patch 1523 and the fourth conductive patch 1524 may be at least partially similar to a conductive patch of FIG. 7 (e.g., the conductive patch 740 of FIG. 7). According to an example embodiment, the PCB 1520 may include the second antenna array AR2 in which the antenna elements R5, R6, R7, and R8 having a 1×4 array structure are disposed. In another embodiment, the PCB 1520 may include antenna arrays in which various numbers of antenna elements are disposed in various forms. In another embodiment, the number of antenna elements of the first antenna array AR1 positioned in the substrate 1510 and the number of antenna elements of second antenna array AR2 positioned in the PCB 1520 may be different.

According to various embodiments, the antenna module 1500 may include a wireless communication circuitry 1527 positioned in the second face 1526 of the PCB 1520. According to an example embodiment, the wireless communication circuitry 1527 may be electrically connected to the substrate 1510 by the conductive cable 1531. According to an example embodiment, the wireless communication circuitry 1527 may be configured to transmit and/or receive a radio frequency of about a 3 GHz~100 GHz range through the first antenna array AR1 and/or the second antenna array AR2.

Referring to FIG. 15B, unlike in the first antenna module 1500, in the second antenna module 1530, the first antenna array AR1 and the second antenna array AR2 may be positioned together on or within the first face 1525 of the PCB 1520.

Figure 16:
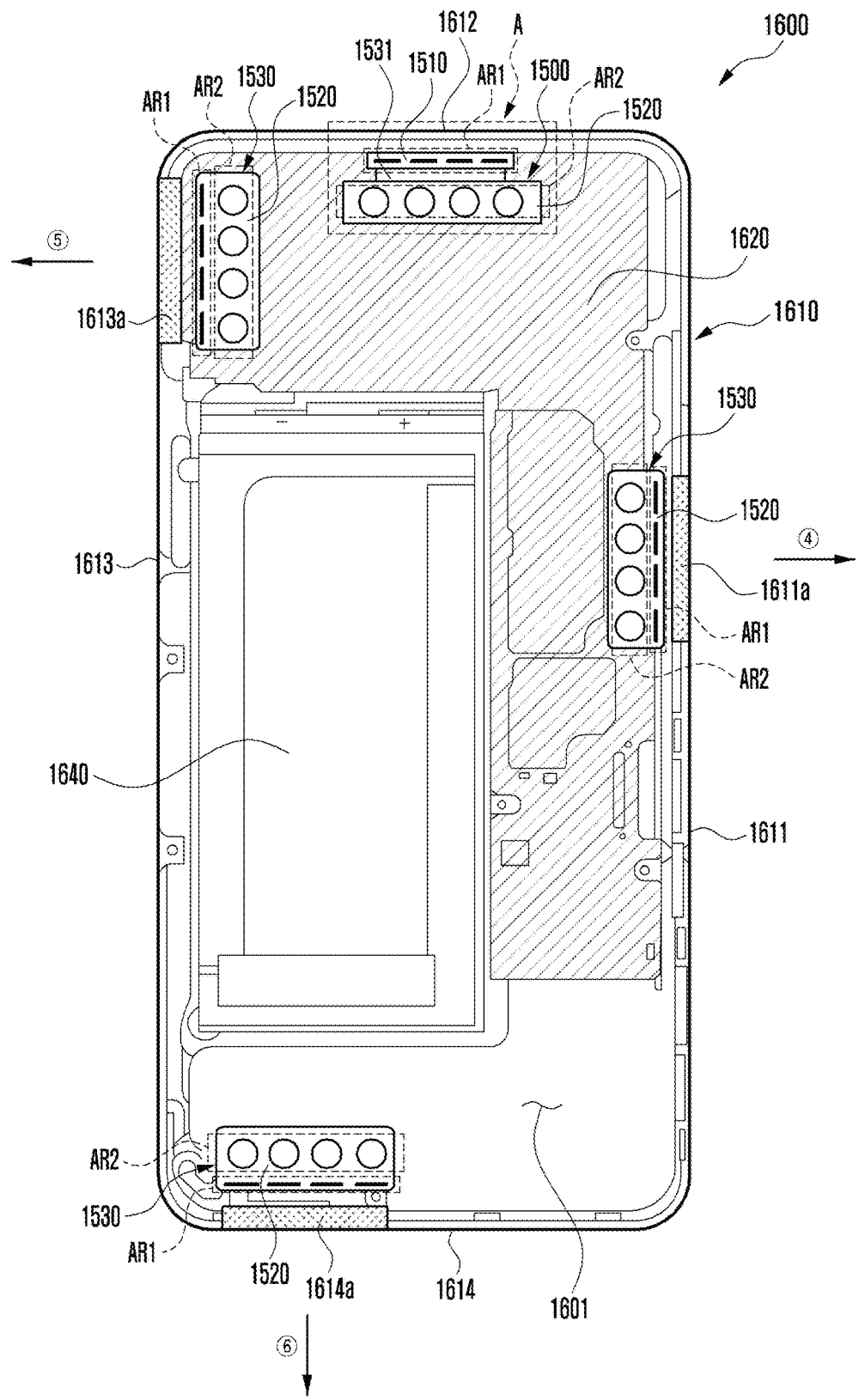
FIG. 16 is a diagram illustrating an example arrangement relation in which the antenna modules of FIGS. 15A and 15B are disposed in an electronic device according to various embodiments.

FIG. 16 is a diagram illustrating an arrangement relation in which the antenna modules 1500 and 1530 of FIGS. 15A and 15B are positioned in an electronic device 1600 according to various embodiments of the disclosure.

Referring to FIG. 16, the electronic device 1600 may include a side member 1610. According to an example embodiment, the side member 1610 may include a first side 1611 having a first length, a second side 1612 extending in a vertical direction from the first side 1611 and having a second length shorter than the first length, a third side 1613 extending in a direction parallel to the first side 1611 from the second side 1612 and having the first length, and a fourth side 1614 extending in a direction parallel to the second side 1612 from the third side 1613 and having the second length. According to an example embodiment, the electronic device 1600 may include a device substrate 1620 positioned in an internal space 1601 in such a way as to avoid the battery 1640 and to overlap the battery 1640 at least partially. According to an example embodiment, the first antenna module 1500 of FIG. 15A and the second antenna modules 1530 of FIG. 15B may be positioned in various directions in the internal space 1601, and may be electrically connected to the device substrate 1620.

According to various embodiments, the first antenna module 1500 may be positioned near the second side 1612. According to an example embodiment, a plurality of the second antenna modules 1530 may be disposed. For example, the second antenna modules 1530 may be disposed near the first side 1611, near the third side 1613 and/or the fourth side 1614. According to an example embodiment, the first antenna array AR1 of the second antenna module 1530 positioned near the first side 1611 may form a beam pattern in a direction (e.g., direction ④) toward which the first side 1611 is directed through a first non-conductive area 1611*a* partially formed in the first side 1611. The second antenna array AR2 of the second antenna module 1530 positioned near the first side 1611 may form a beam pattern in a direction (e.g., the –z direction of FIG. 3B) toward which the rear plate of the electronic device 1600 (e.g., the rear plate 311 of FIG. 3B) is directed. According to an example embodiment, the first antenna array AR1 of the second antenna module 1530 positioned near the third side 1613 may form a beam pattern in a direction (e.g., direction ⑤) toward which the third side 1613 is directed through a second non-conductive area 1613*a* partially formed in the third side 1613. The second antenna array AR2 of the second antenna module 1530 positioned near the third side 1613 may form a beam pattern in a direction (e.g., the –z direction of FIG. 3B) toward which the rear plate of the electronic device 1600 (e.g., the rear plate 311 of FIG. 3B) is directed. According to an example embodiment, the first antenna array AR1 of the second antenna module 1530 positioned near the fourth side 1614 may form a beam pattern in a direction (e.g., direction ⑥) toward which the fourth side 1614 is directed through a third non-conductive area 1614*a* partially formed in the fourth side 1614. The second antenna array AR2 of the second antenna module 1530 positioned near the fourth side 1614 may form a beam pattern in a direction (e.g., the –z direction of FIG. 3B) toward which the rear plate (e.g., the rear plate 311 of FIG. 3B) of the electronic device 1600 is directed.

According to various embodiments, unlike in the second antenna module 1530, the first antenna array AR1 of the first antenna module 1500 positioned near the second side 1612 may form a beam pattern in a direction (e.g., the z direction of FIG. 3A) toward which the front plate (e.g., the front plate 302 of FIG. 3A) of an electronic device (e.g., the electronic device 300 of FIG. 3A) is directed. The second antenna array AR2 of the first antenna module 1500 positioned near the second side 1612 may form a beam pattern in a direction (e.g., the –z direction of FIG. 3B) toward which the rear plate (e.g., the rear plate 311 of FIG. 3B) of the electronic device 1600 is directed. In such a case, the first antenna array AR1 is positioned at least partially similar to the arrangement structure of the substrate of FIG. 5 (e.g., the substrate 552 of FIG. 5). Accordingly, beam coverage in the direction (e.g., the z direction of FIG. 3A) toward which the front plate is directed can be secured.

Figure 17:
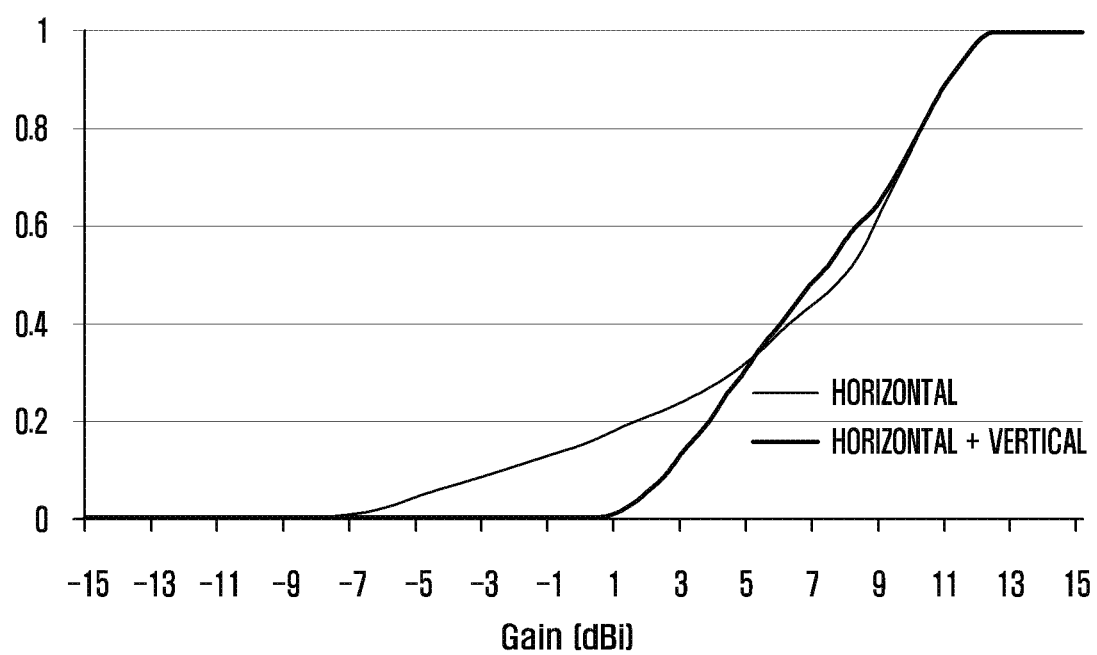
FIG. 17 is a graph illustrating a cumulative distribution function (CDF) according to an arrangement relation between antenna modules disposed in an electronic device according to various embodiments.

FIG. 17 is a graph illustrating an example cumulative distribution function (CDF) according to an arrangement relation between antenna modules disposed in an electronic device according to various embodiments of the disclosure.

FIG. 17 is a graph illustrating a comparison between the CDF of an antenna module having a horizontal arrangement structure (e.g., the arrangement structure of the second antenna module 1530 of FIG. 16) and the CDF of an antenna module having a horizontal+vertical arrangement structure (e.g., the arrangement structure of the first antenna module 1500 of FIG. 16). The antenna module having the horizontal+vertical arrangement structure may form beam coverage in a section having a relatively high gain, compared to the antenna module having the horizontal arrangement structure. For example, in a CDF 20% section, the antenna module having the horizontal arrangement structure is covered in about 1.6 dBi or less, whereas the antenna module having the horizontal+vertical arrangement structure may be covered in relatively high 3.8 dBi or less. This may mean that the antenna module having the horizontal+vertical arrangement structure form a relatively uniform beam pattern.

Figure 18A:
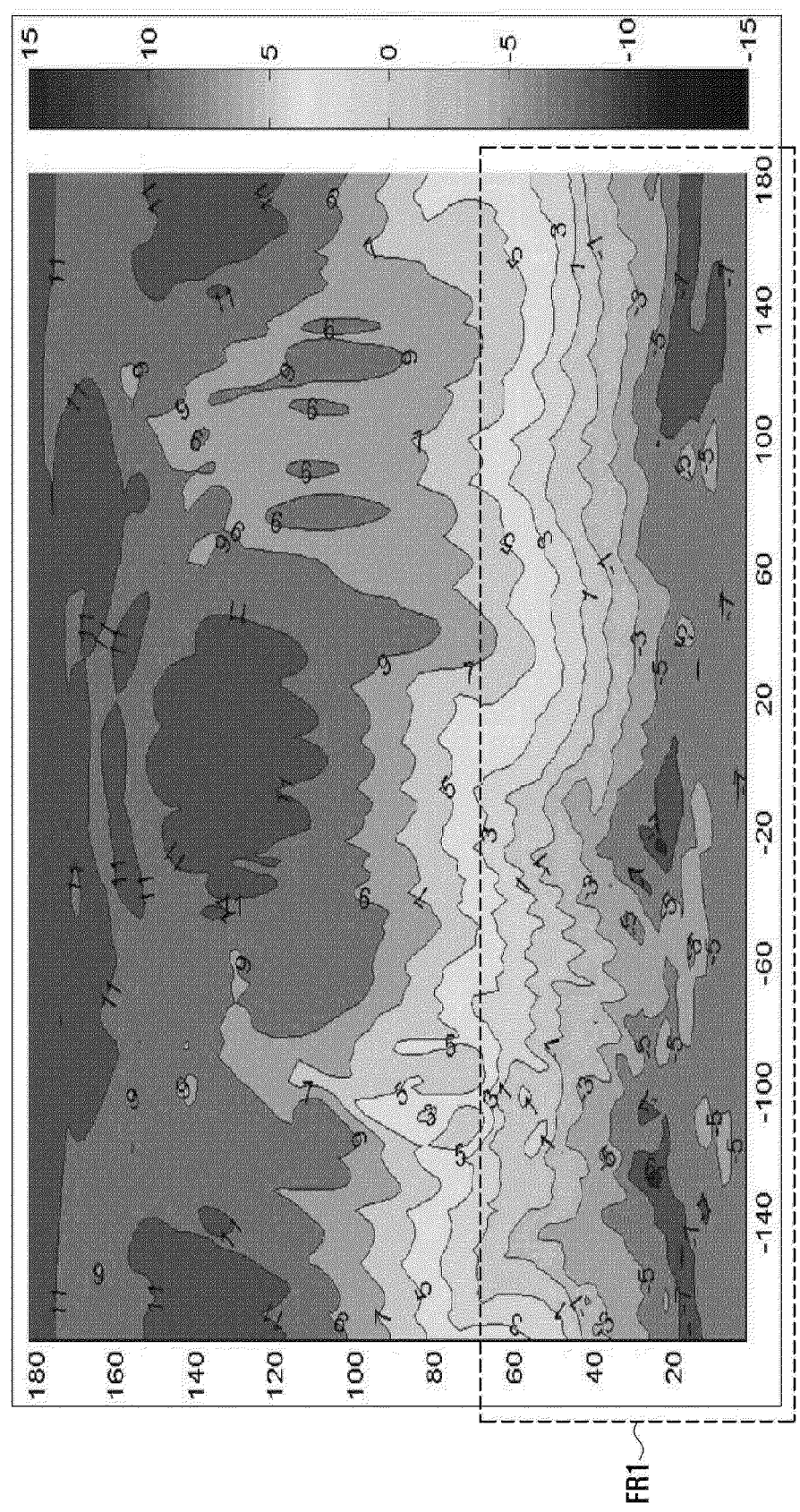
FIG. 18A is a diagram illustrating a comparison between pieces of beam coverage according to an arrangement relation between antenna modules disposed in an electronic device according to various embodiments.
Figure 18B:
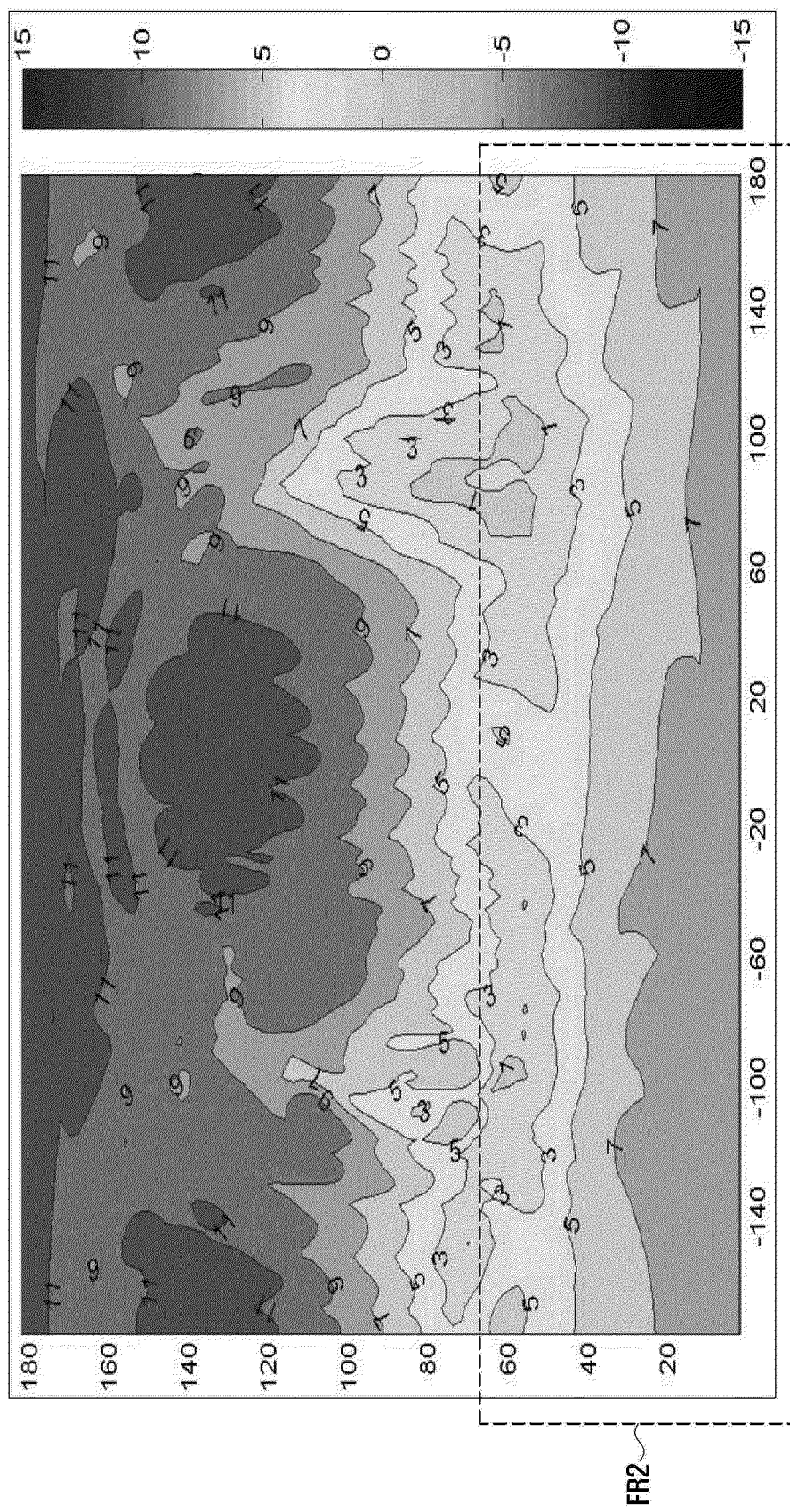
FIG. 18B is a diagram illustrating a comparison between pieces of beam coverage according to an arrangement relation between antenna modules disposed in an electronic device according to various embodiments.

FIG. 18A is a diagram illustrating an example comparison between pieces of beam coverage according to an arrangement relation between antenna modules disposed in an electronic device (e.g., the electronic device 1600 of FIG. 16) according to various embodiments of the disclosure. FIG. 18B is a diagram illustrating an example comparison between pieces of beam coverage according to an arrangement relation between antenna modules disposed in an electronic device (e.g., the electronic device 1600 of FIG. 16) according to various embodiments of the disclosure. It can be seen that beam coverage in the front plate area FR2 of FIG. 18B is better than that in the front plate area FR1 of FIG. 18A if an antenna module (e.g., the second antenna module 1530 of FIG. 15B) having a horizontal arrangement structure and an antenna module (e.g., the first antenna module 1500 of FIG. 15A) having a horizontal+vertical arrangement structure are positioned at the same location (e.g., near the second side 1612 of FIG. 16).

Figure 19:
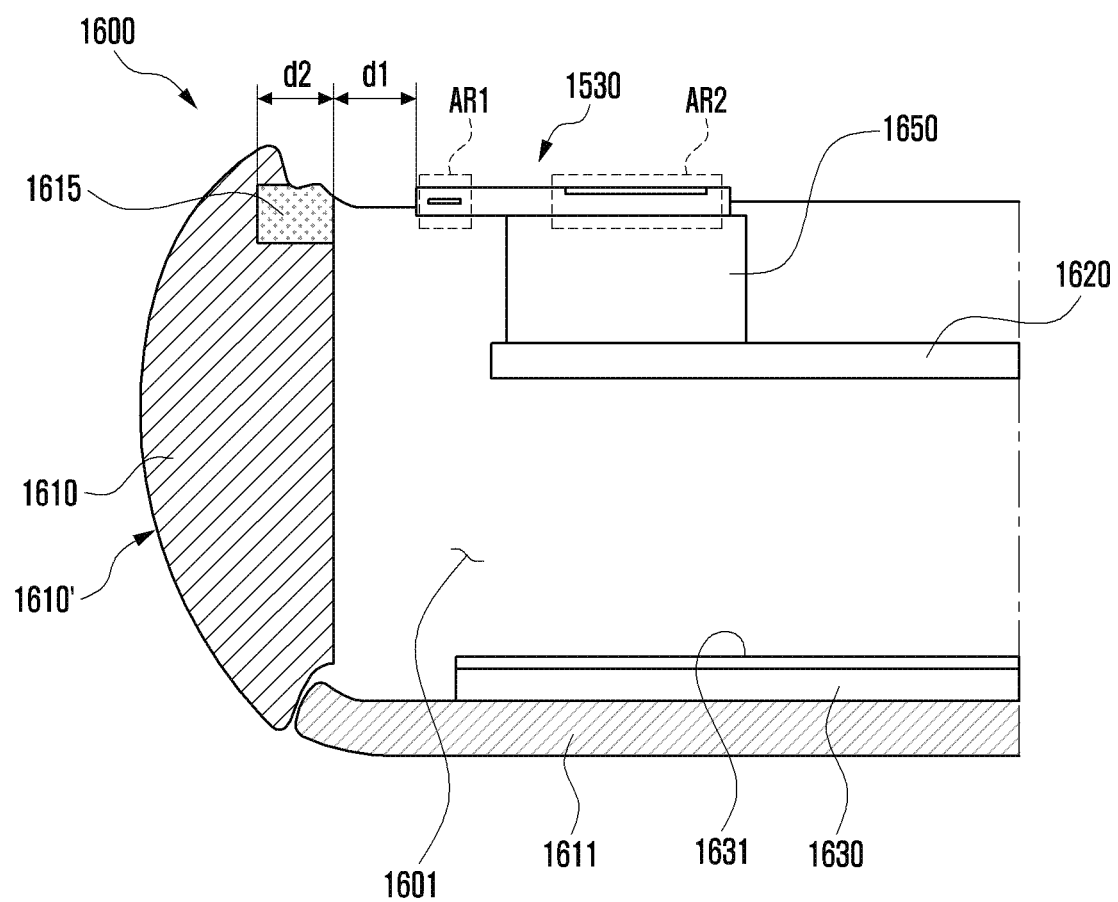
FIG. 19 is a sectional view illustrating various parts of the electronic device of FIG. 16 according to various embodiments.

FIG. 19 is a sectional view illustrating various parts of the example electronic device 1600 of FIG. 16 according to various embodiments of the disclosure.

The electronic device 1600 of FIG. 19 is at least partially similar to the electronic device 101 of FIG. 1 or the electronic device 300 of FIG. 3A or may include other embodiments of the electronic device.

FIG. 19 is a sectional view of the second antenna module 1530 positioned near the second side 1612 of FIG. 16. The electronic device 1600 may include a housing 1610', including a first plate 1611, a second plate (e.g., the second plate 311 of FIG. 3B) facing a direction opposite the first plate 1611, and a side member 1610 surrounding a space 1601 between the first plate 1611 and the second plate. According to an example embodiment, the electronic device 1600 may include the device substrate 1620 positioned in the internal space 1601 and the second antenna module 1530 positioned through a dielectric structure 1650 having a given shape. According to an example embodiment, the separation distance between the second antenna module 1530 and the side member 1610 made of a conductive material increases as the depth d2 of a polymer member 1615 is increased in a side member direction in the state in which a distance d1 between the first antenna array AR1 and the side member 1610 has been determined. Accordingly, matching can be improved, and thus a gain in the direction of the first plate 1611 can be improved.

Figure 20:
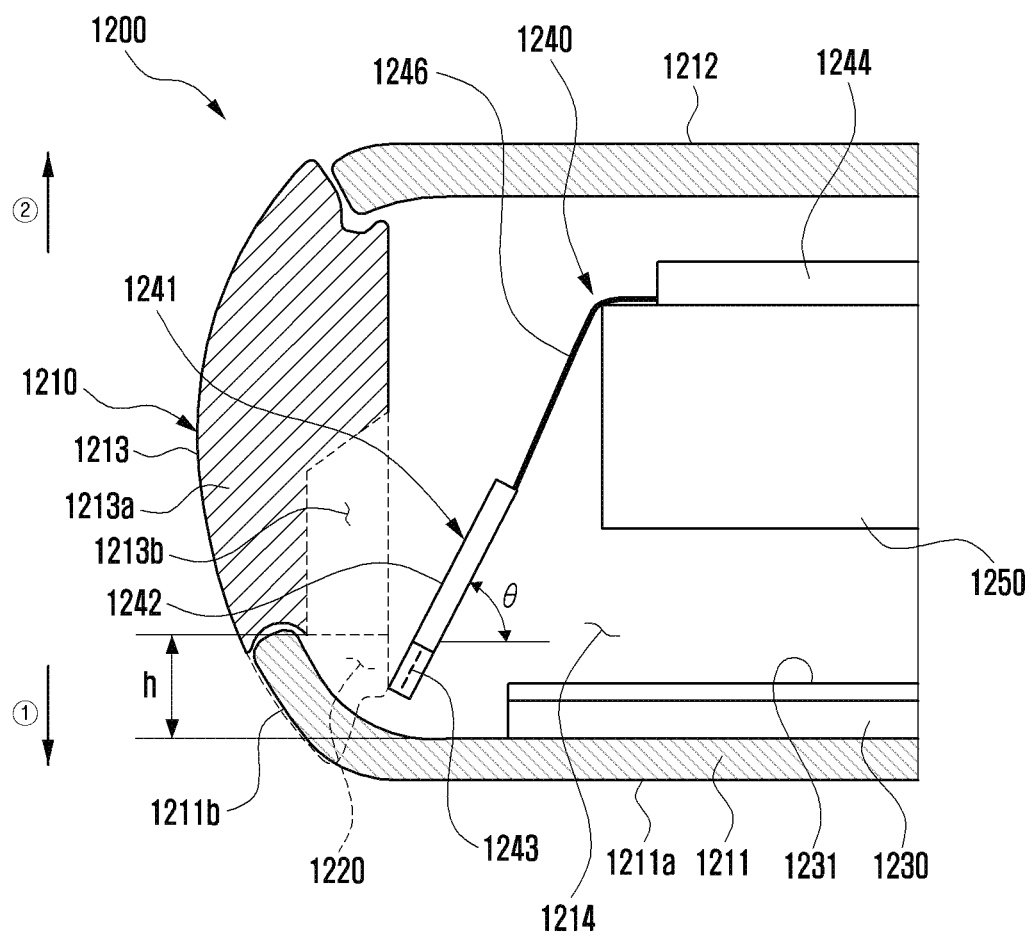
FIG. 20 is a sectional diagram illustrating a side member in which a non-conductive area is formed in the electronic device of FIG. 12 according to various embodiments.

FIG. 20 is a diagram illustrating an example side member 1213 in which a non-conductive area 1213b is formed in the electronic device 1200 of FIG. 12 according to various embodiments of the disclosure.

Referring to FIG. 20, the electronic device 1200 may include an external metal part 1213a and a non-conductive area 1213b formed in at least some area of the external metal part 1213a. According to an example embodiment, a part 1220 coming in contact with the first plate 1211 may be omitted by a given height "h" from the side member 1213 in a direction (e.g., direction ②) toward which the second plate 1212 is directed. A part of the upper side of the side member 1213 is formed to additionally include the non-conductive area 1213b. Accordingly, additional beam coverage of the antenna module 1240 can be extended. In such a case, the non-conductive area 1213b may be filled with the internal polymer part or may be formed of an air area from which a corresponding area has been deleted.

Figure 21:
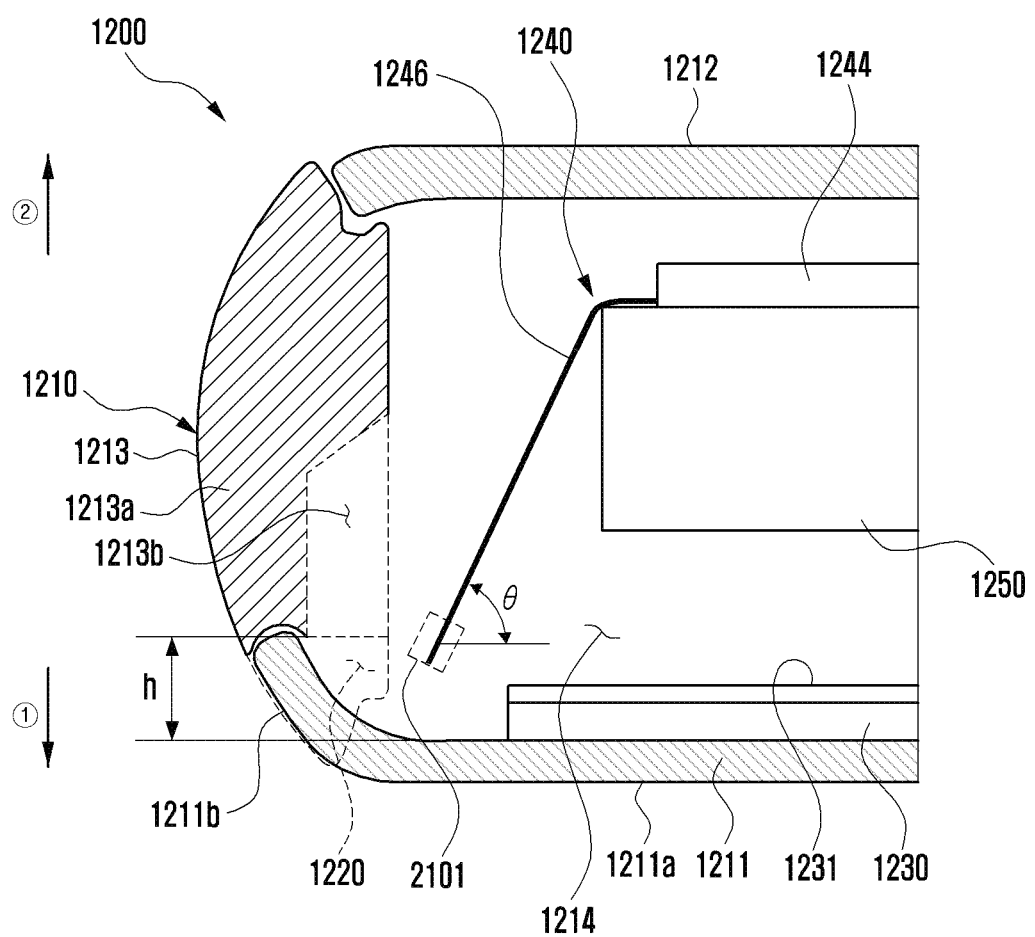
FIG. 21 is a sectional view illustrating various parts of an electronic device according to various embodiments.

FIG. 21 is a sectional view illustrating various parts of the example electronic device 1200 according to various embodiments of the disclosure.

FIG. 21 is a diagram illustrating the state in which the conductive cable 1246 including a conductive pattern arrangement area 2101 is directly positioned without a substrate in the electronic device 1200 of FIG. 20.

Referring to FIG. 21, the electronic device 1200 may include an external metal part 1213a and a non-conductive area 1213b formed in at least some area of the external metal part 1213a. According to an example embodiment, a part 1220 coming in contact with the first plate 1211 may be omitted from the side member 1213 by a given height "h" in a direction (e.g., direction ②) toward which the second plate 1212 is directed. A part of the upper side of the side member 1213 is formed to additionally include the non-conductive area 1213b. Accordingly, additional beam coverage of the antenna module 1240 can be extended. In such a case, the non-conductive area 1213b may be filled with the internal polymer part or may be formed of an air area from which a corresponding area has been deleted.

According to various embodiments, the antenna module 1240 may include the conductive cable 1246 extending from the PCB 1244 and positioned at a given angle θ to the first plate 1211. According to an example embodiment, the conductive cable 1246 may include an FPCB. In such a case, the conductive cable 1246 may be positioned to be supported through at least part of a separate support member (e.g., the support member 1150 of FIG. 11). According to an example embodiment, the antenna module 1240 may include the conductive pattern arrangement area 2101 positioned at the end of the conductive cable 1246. According to an example embodiment, when the side member 1213 is viewed from above, in the conductive pattern arrangement area 2101, at least an additional non-conductive area 1213b and/or the side member 1213 may be positioned at a location overlapping the part 1220 coming in contact with the first plate 1211.

In an electronic device according to various embodiments of the disclosure, beam coverage performance in a given direction (e.g., the front direction of the electronic device) can be improved because at least part of a conductive member (e.g., side member) positioned near a display is omitted and the arrangement structure of an antenna is changed.

According to various example embodiments, an electronic device (e.g., the electronic device 500 of FIG. 5) includes a housing (e.g., the housing 510 of FIG. 5) including a first glass plate (e.g., the first plate 511 of FIG. 5) facing a first direction (e.g., the first direction (e.g., direction ①) of FIG. 5)), a second plate (e.g., the second plate 512 of FIG. 5) facing a second direction (e.g., the second direction (e.g., direction ②) of FIG. 5)) opposite the first direction, and a side housing (e.g., the side member 513 of FIG. 5) surrounding a space (e.g., the space 514 of FIG. 5) between the first glass plate and the second plate, wherein the side housing includes a first portion, including an external metal part (e.g., the external metal part 521 of FIG. 5) having a first face (e.g., the first face 5211 of FIG. 5) facing an outside and a second face (e.g., the first face 5212 of FIG. 5) facing the space and an internal polymer part (e.g., the internal polymer part 522 of FIG. 5) having a third face (e.g., the third face 5221 of FIG. 5) contacting the second face and a fourth face (e.g., the fourth face 5222 of FIG. 5) facing the space; a touch screen display (e.g., the display 530 of FIG. 5) positioned within the space to be seen through the first glass plate, wherein an edge (e.g., the edge 532 of FIG. 5) of the touch screen display is spaced apart from (e.g., the gap "g" of FIG. 5) from the first portion of the side member and when the first glass plate is viewed from above, the gap is covered by a peripheral portion (e.g., the peripheral portion 540 of FIG. 5) of the first glass plate; an antenna structure comprising at least one antenna and (e.g., the antenna structure 551 of FIG. 5) including a substrate (e.g., the substrate 552 of FIG. 5) having a fifth face (e.g., the fifth face 5521 of FIG. 5) substantially parallel to the second face and a sixth face (e.g., the sixth face 5522 of FIG. 5) facing a direction opposite the fifth face and at least one conductive pattern (e.g., the conductive pattern 553 of FIG. 5) positioned between the fifth face and the sixth face extending toward the peripheral portion of the first glass plate; and wireless communication circuitry (e.g., the wireless communication circuitry 5541 of FIG. 5) operatively connected to the at least one conductive pattern and configured to form a directivity beam using at least some of the at least one conductive pattern.

According to various example embodiments, the sixth face may be substantially vertical to the touch screen display.

According to various example embodiments, the sixth face may form an acute angle with the touch screen display.

According to various example embodiments, the first glass plate (e.g., the first plate 511 of FIG. 5) may include a planar portion (e.g., the planar part 5111 of FIG. 5). The peripheral portion of the first glass plate may be bent from the planar portion (e.g., the curved part 5112 of FIG. 5).

According to various example embodiments, the at least one conductive pattern may be positioned at least partially within the gap.

According to various example embodiments, at least part of the at least one conductive pattern may be positioned at a location overlapping the internal polymer part when the side member is viewed from above.

According to various embodiments, when the first glass plate is viewed from above, the conductive pattern may be positioned at a location overlapping at least some area of the touch screen display. The substrate may form an acute angle along with the touch screen display to be directed toward the gap.

According to various example embodiments, the display further may include a cutting portion (e.g., the cutting part 1432 of FIG. 14A) from which an area overlapping the conductive pattern is omitted when the first glass plate is viewed from above.

According to various example embodiments, the cutting portion may be positioned in a black matrix (BM) area of the touch screen display.

According to various example embodiments, the electronic device may further include a printed circuit board (PCB) (e.g., the PCB 554 of FIG. 5) positioned in the space and spaced apart from the substrate and a conductive cable (e.g., the conductive cable 555 of FIG. 5) configured to electrically connect the PCB and the at least one conductive pattern of the substrate.

According to various example embodiments, the wireless communication circuitry may be positioned in the PCB.

According to various example embodiments, the electronic device may further include at least one conductive patch (e.g., the conductive patch 5542 of FIG. 6) positioned on one side of the PCB. The wireless communication circuitry may form a directivity beam having a direction different from the direction of the conductive pattern using the conductive patch.

According to various example embodiments, the wireless communication circuitry may be configured to form a directivity beam in a direction which the first glass plate is facing through the conductive pattern and to form a directivity beam in a direction which the second plate is facing through the conductive patch.

According to various example embodiments, the wireless communication circuitry may be configured to transmit and/or receive a radio frequency of about a 3 GHz~100 GHz range through the at least one conductive patch.

According to various example embodiments, the electronic device may further include a support member (e.g., the support member 560 of FIG. 5) positioned to support the PCB and/or the substrate within the space.

According to various example embodiments, the support member may include a dielectric material.

According to various example embodiments, the electronic device may further include at least one conductive electronic portion (e.g., the electronic part 570 of FIG. 5) within the space. The support member may be positioned between the conductive electronic part and the PCB and/or the substrate.

According to various example embodiments, the support member may include a first support (e.g., the first support 561 of FIG. 5) configured to support the substrate and a second support (e.g., the second support 562 of FIG. 5) extending from the first support and configured to support the PCB. An angle (e.g., the angle θ of FIG. 5) between the substrate (e.g., the substrate 552 of FIG. 5) and the touch screen display (e.g., the display 530 of FIG. 5) may be determined by a shape of the first support.

According to various example embodiments, the substrate (e.g., the substrate 552 of FIG. 5) may include a flexible printed circuit board (FPCB) positioned to be supported by the first support.

According to various example embodiments, the wireless communication circuitry may be configured to transmit and/or receive a radio frequency of about a 3 GHz~100 GHz range through the at least one conductive pattern.

Various example embodiments illustrated and disclosed in this disclosure and drawings are merely examples provided to aid in description of the technological contents according to the embodiments of the disclosure and to aid in understanding of the embodiments of the disclosure, but are not intended to limit the scope of the embodiments of the disclosure. Accordingly, the scope of disclosure should be understood as including all changes or modified forms derived based on the technical spirit of various example embodiments of the disclosure in addition to the disclosed example embodiments.

What is claimed is:

1. An electronic device, comprising:
a housing comprising a first plate facing a first direction, a second plate facing a second direction opposite the first direction, and a side housing surrounding a space between the first plate and the second plate, wherein the side housing comprises a first portion, comprising an external metal part having a first face facing an outside and a second face facing the space and an internal polymer portion having a third face contacting the second face and a fourth face facing the space;
a touch screen display positioned within the space to be viewable through the first plate, wherein an edge of the touch screen display includes a gap from the first portion of the side member, wherein the gap is covered by a peripheral portion of the first plate when the first plate is viewed from above;
an antenna structure comprising at least one antenna and comprising a substrate having a fifth face substantially parallel to the second face and a sixth face facing a direction opposite the fifth face and at least one conductive pattern positioned between the fifth face and the sixth face and extending toward the peripheral portion of the first plate; and
wireless communication circuitry operatively connected to the at least one conductive pattern and configured to form a directivity beam using at least a part of the at least one conductive pattern.

2. The electronic device of claim 1, wherein the sixth face is substantially vertical to the touch screen display.

3. The electronic device of claim 1, wherein the sixth face forms an acute angle with the touch screen display.

4. The electronic device of claim 1, wherein:
the first plate comprises a planar portion, and
the peripheral portion of the first plate is bent from the planar portion.

5. The electronic device of claim 1, wherein the at least one conductive pattern is positioned at least partially within the gap.

6. The electronic device of claim 1, wherein at least part of the at least one conductive pattern is positioned at a location overlapping the internal polymer portion when the side member is viewed from above.

7. The electronic device of claim 1, wherein:
the conductive pattern is positioned at a location overlapping at least a portion of an area of the touch screen display when the first plate is viewed from above, and
the substrate forms an acute angle with the touch screen display directed toward the gap.

8. The electronic device of claim 1, wherein the display further comprises a cutting portion from which an area overlapping the conductive pattern is not visible when the first plate is viewed from above.

9. The electronic device of claim 8, wherein the cutting portion is positioned in a black matrix (BM) area of the touch screen display.

10. The electronic device of claim 1, further comprising:
a printed circuit board (PCB) positioned in the space and spaced apart from the substrate; and
a conductive cable configured to electrically connect the PCB and the at least one conductive pattern of the substrate.

11. The electronic device of claim 10, wherein the wireless communication circuitry is positioned in the PCB.

12. The electronic device of claim 10, further comprising at least one conductive patch positioned on one side of the PCB,
wherein the wireless communication circuitry forms a directivity beam having a direction different from a direction of the conductive pattern using the conductive patch.

13. The electronic device of claim 12, wherein the wireless communication circuitry is configured to:
form a directivity beam in a direction in which the first plate faces using the conductive pattern, and
form a directivity beam in a direction in which the second plate faces using the conductive patch.

14. The electronic device of claim 12, wherein the wireless communication circuitry is configured to transmit and/or receive a radio frequency in a range of about a 3 GHz~100 GHz through the at least one conductive patch.

15. The electronic device of claim 10, further comprising a support positioned to support the PCB and/or the substrate within the space.

16. The electronic device of claim 15, wherein the support comprises a dielectric material.

17. The electronic device of claim 15, further comprising at least one conductive electronic part positioned within the space,
wherein the support is positioned between the conductive electronic part and the PCB and/or the substrate.

18. The electronic device of claim 15, wherein the support comprises:
a first support configured to support the substrate; and
a second support extending from the first support and configured to support the PCB,
wherein an angle between the substrate and the touch screen display is determined by a shape of the first support.

19. The electronic device of claim 18, wherein the substrate comprises a flexible printed circuit board (FPCB) supported by the first support.

20. The electronic device of claim 1, wherein the wireless communication circuitry is configured to transmit and/or receive a radio frequency in a range of about a 3 GHz~100 GHz through the at least one conductive pattern.

* * * * *